US012755041B2

(12) United States Patent
Cassidy et al.

(10) Patent No.: US 12,755,041 B2
(45) Date of Patent: Oct. 6, 2026

(54) SYSTEM AND METHOD OF IN-PLACE CONTENT MANAGEMENT

(71) Applicant: SHINYDOCS CORPORATION, Kitchener (CA)

(72) Inventors: Jason William David Cassidy, Kitchener (CA); Mark Kraatz, London (CA); Khalid Merhi, Kitchener (CA); Cristina Nemes, Stratford (CA); Davey Slimmon, Ottawa (CA); Benjamin Barth, Waterloo (CA); Robert Haskett, Kitchener (CA); Christie Felker, Waterloo (CA); Babalakin Oyewumi, Kitchener (CA); Craig Treulieb, Kitchener (CA); Nick Whitney, Kitchener (CA); Mika Gelderman, Baden (CA); Stacey West, Cambridge (CA)

(73) Assignee: SHINYDOCS CORPORATION

( * ) Notice: Subject to any disclaimer, the term of this patent is extended or adjusted under 35 U.S.C. 154(b) by 0 days.

(21) Appl. No.: 18/561,722

(22) PCT Filed: May 28, 2023

(86) PCT No.: PCT/CA2023/050731

§ 371 (c)(1),
(2) Date: Nov. 16, 2023

(87) PCT Pub. No.: WO2023/225763

PCT Pub. Date: Nov. 30, 2023

(65) Prior Publication Data

US 2025/0086299 A1 Mar. 13, 2025

Related U.S. Application Data

(60) Provisional application No. 63/365,423, filed on May 27, 2022.

(51) Int. Cl.
*G06F 21/62* (2013.01)
*G06F 16/11* (2019.01)

(52) U.S. Cl.
CPC ................................ *G06F 21/6218* (2013.01)

(58) Field of Classification Search
CPC ...... G06F 16/122; G06F 16/168; G06F 16/93; G06F 21/6218
See application file for complete search history.

(56) References Cited

U.S. PATENT DOCUMENTS

| | | | | |
|---|---|---|---|---|
| 10,606,766 | B1 * | 3/2020 | Rellinger ................ | G06F 21/60 |
| 10,635,641 | B1 * | 4/2020 | Donze ..................... | G06F 16/93 |

(Continued)

OTHER PUBLICATIONS

PCT International Search Report for PCT/CA2023/050731 dated Sep. 5, 2023.

*Primary Examiner* — Gary S Gracia

(57) ABSTRACT

A system and method of an in-place content management system that allows an organization to bring the power of an enterprise content management (ECM) system (supporting such features as check-out, check-in, security, audit, add, rename, move, delete, classification, legal holds and disposition) to the data where it resides on an NTFS file system, eliminating the need to move it somewhere else and without having to change the way end-users work. A utility or tool for content management that leverages the existing security that is already in place on files and folders and adds basic content management features such as check-out/check-in (preventing multiple users from editing the same document at the same time), audit history, and the ability to add classifications, trigger dispositions, and apply legal holds on documents where they currently reside.

9 Claims, 18 Drawing Sheets

(56) References Cited

U.S. PATENT DOCUMENTS

| | | | | |
|---|---|---|---|---|
| 10,768,973 | B1 * | 9/2020 | Jin | G06F 16/178 |
| 10,866,963 | B2 * | 12/2020 | Kleinpeter | G06F 16/11 |
| 11,038,945 | B2 * | 6/2021 | Cassidy | H04L 67/1097 |
| 11,275,795 | B2 * | 3/2022 | Jayaram | G06F 16/252 |
| 2002/0133491 | A1 * | 9/2002 | Sim | H04L 69/14 |
| 2006/0184540 | A1 * | 8/2006 | Kung | G06Q 10/10 |
| 2009/0112678 | A1 * | 4/2009 | Luzardo | G06Q 10/0639 705/7.38 |
| 2014/0019426 | A1 * | 1/2014 | Palmer | G06F 16/256 707/694 |
| 2015/0127607 | A1 * | 5/2015 | Savage | G06F 16/1873 707/693 |
| 2019/0079931 | A1 * | 3/2019 | Wetherall | G06F 16/93 |
| 2019/0180822 | A1 | 6/2019 | Dunga et al. | |
| 2019/0205415 | A1 | 7/2019 | Kleinpeter et al. | |
| 2019/0279101 | A1 * | 9/2019 | Habti | G06F 9/541 |
| 2020/0356534 | A1 * | 11/2020 | R. | G06F 9/526 |
| 2022/0124142 | A1 * | 4/2022 | Cassidy | G06F 3/067 |
| 2023/0269239 | A1 * | 8/2023 | Mustafi | H04L 63/0428 726/4 |
| 2025/0086299 | A1 * | 3/2025 | Cassidy | G06F 16/93 |

* cited by examiner

910

912

SYSTEM AND METHOD OF IN-PLACE CONTENT MANAGEMENT

CROSS REFERENCE TO RELATED APPLICATION

The application claims priority and the benefit of U.S. Provisional Patent Application Ser. No. 63/365,423, entitled "SYSTEM AND METHOD OF IN-PLACE CONTENT MANAGEMENT", filed on May 27, 2022 and international PCT application PCT/CA2023/050731, entitled "SYSTEM AND METHOD OF IN-PLACE CONTENT MANAGEMENT", filed on May 28, 2023, the disclosure of which is incorporated herein by reference in its entirety.

FIELD

This disclosure relates to computer systems and, more specifically, to local (on premises) file storage and access.

BACKGROUND

New Technology File System (NTFS) file systems (file shares) are often used to store files and other data for access by users of an organization's computers.

Since the start of the digital revolution, organizations have been creating digital content at an accelerating pace without considering how to find, manage and action all these unstructured documents. At a mid-sized company, this can amount to hundreds of terabytes (TB) of data which corresponds to the creation of hundreds of millions of documents. At a large-sized company this can amount to petabytes (PB) of data (each petabyte corresponds to about a billion documents). When these companies wish to get their file system documents "under management", their only historical option has been to migrate these documents into a proprietary enterprise content management (ECM) solution such as OpenText's Content Server or Microsoft's SharePoint Online.

The problem with this approach is three-fold. First, migrating data takes a lot of time. Migrations of smaller amounts (i.e., a few terabytes) of data can take a few months, while migrating a lot of data may take years. Organizations may not be willing to wait that long for such migrations to complete.

Second, ECM solutions may have upper limits as to how much data they can realistically hold. For example, the Open Text Content Server may have a limit of 300 terabytes of data. If an organization has data stores measured in petabytes (PB), there is no ECM that can realistically hold that much data.

Third, ECM solutions often result in an end-user experience that is worse than it was before the data was moved into the new ECM. Finding and/or accessing documents becomes more difficult and, in general, is much slower. For example, editing a document in a cloud-based system is typically much slower than editing one that is on a local file system.

Companies who wish to get all of their file system documents "under management" by migrating it into an ECM solution may not even have a complete solution for all of their data. A typical pitfall for an organization implementing a migration to an ECM solution occurs in the process of moving data from their original storage location(s) to the new destination location. Since migrating large volumes of data takes time to not only move, but also validate the outcome, this approach introduces new risks to the reliability and availability of those data assets.

An organization may attempt to soften the impact of the data movement by iteratively selecting subsets of data to move at one time, but this also introduces instability into the data system as it is difficult to have assurance that the location of important data is known at all times. In addition, the process to select batches of data to move may overlook important records and sever dependencies between different data stores, ultimately increasing the probability of losing important information.

Furthermore, businesses and companies are required to understand all their data, even though it may be scattered across multiple repositories and growing at an exponential rate. Additionally, businesses are worried about risks relating to cyber-threats, security breaches and managing data loss prevention.

What is desired is a tool or utility that allows or maintains easy access to data, while providing the functionality of an enterprise content management (ECM) system, without the requirement to export any data from their existing file system(s).

SUMMARY

A system and method of an in-place content management system that allows an organization to bring the power of an enterprise content management (ECM) system (supporting such features as check-out, check-in, security, audit, add, rename, move, delete, classification, legal holds and disposition) to the data where it resides on an NTFS file system, eliminating the need to move it somewhere else and without having to change the way end-users work. A utility or tool for content management that leverages the existing security that is already in place on files and folders and adds basic content management features such as check-out/check-in (preventing multiple users from editing the same document at the same time), audit history, and the ability to add classifications, trigger dispositions, and apply legal holds on documents where they currently reside.

According to this disclosure, a software-based utility or tool for content management which may be involved in document intelligence, including organizing enterprise information and making it actionable and understood. Further, the utility or tool should also be concerned with data governance and information security.

According to this disclosure, a software-based utility or tool for content management which should provide auto-classification of data at machine speed, using artificial intelligence to bring documents into compliance, and ensure the right information gets to the right people at the right time.

BRIEF DESCRIPTION OF THE DRAWINGS

The drawings illustrate, by way of example only, embodiments of the present disclosure.

DETAILED DESCRIPTION

Figure 1:
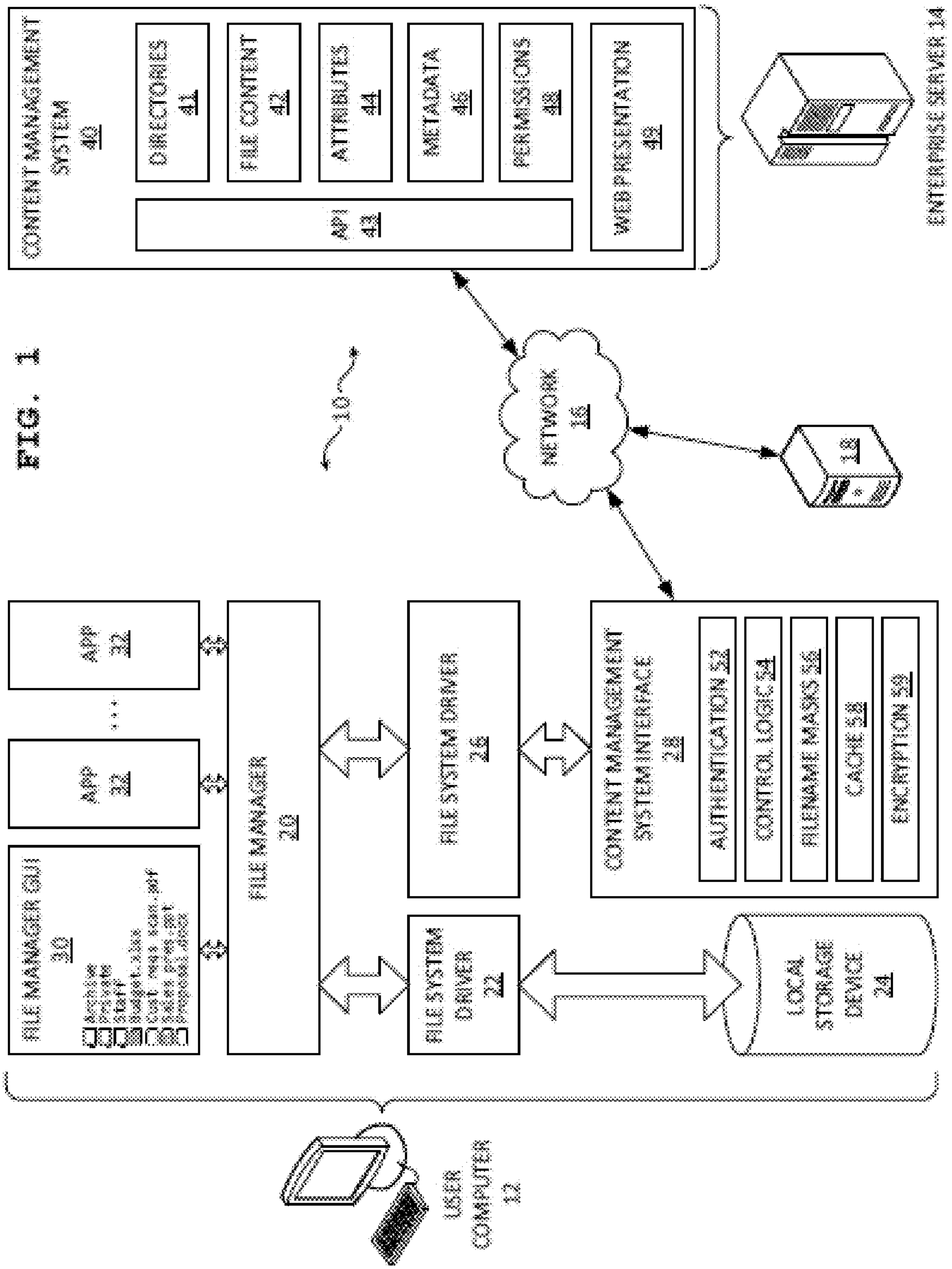
FIG. 1 is a block diagram of a typical networked computer system.

According to this disclosure, a tool or utility such as Shinydocs Cognitive Suite will be extended to provide Enterprise Content Management (ECM) value in-place on Shared drives. Using existing connectors, the platform will be extended to apply artificial intelligence (AI)/machine learning (ML) technology to control content permissions and access, legal holds, attribution, classification, and disposal.

Objectives:

One objective of a content management system is to provide de-facto tools and strategy for Enterprise Content that scales to the modern volumes of content data and eliminates human intervention on mundane content and tasks.

To achieve this objective, modern content management system tools provide Content Understanding using machine learning (ML), artificial learning (AI), and massively scalable search to rapidly understand, find, manage, and action these data; increase worker productivity; automate simple content tasks; and action content which results in decreased costs and liability.

According to the disclosure, the objectives of this tool or utility include providing enterprise value including discovery, legal holds, content prioritization, and disposition across all enterprise content and data contained in the enterprise content management system.

According to the disclosure, a further objective is to develop the functionality to save, remove access and restore access based on a "state in time" for a network drive. This includes the following:

- snapshotting a network drive's contents,
- locking down a network drive's contents,
- restoring removed permissions to their previous state for given files on a network drive that has had a snapshot taken.

According to the disclosure, a further objective is to develop the functionality to provide basic document management on a network drive. This includes the following capabilities:

- check-out files,
- check-in files.

According to the disclosure, a further objective is to enhance the basic document management on a network drive with support for inherent file features, such as file move, file rename and file copy. This will be implemented for a given user with appropriate permissions (as confirmed by checking our "shadow copy" permissions) before the permissions were removed.

According to the disclosure, a further objective is to enhance the improved document management features with content management features. This includes the following functions:

- legal holds,
- disposition,
- classification.

The underlying cornerstone of this disclosure is to leverage the power of New Technology File System (NTFS) permissions for controlling access to documents (i.e., files) themselves in concert with a companion application for higher level content management functionality. The approach is the following:

- First, scan the selected file system, making a "shadow copy" of the existing permissions on all files and folders in the file system. When this is done, load the entire folder structure into a database so there is a record of the structure and the metadata associated with all files and folders.
- Next, file system permissions are changed so that everything but read-access is removed from all files and folders in the selected file system. Access permissions at the user level are not changed: any user who had the ability to read the file or folder previously still has this ability—and any users who did not have any read access previously do not gain this as a result).

From this point forward, end-users gain access to files and folders via a Windows File Explorer add-in that enables the ability to "check-out" documents, temporarily restricting document edit access to a single user, and "check-in" the same documents, restoring edit access once the user is done. The action of editing a document once it has been checked-out is performed in the same manner as users are accustomed to (i.e., double-click on the document to open it in the associated editing tool), thereby requiring no need to change the way users work with documents. Other file system actions such as add, rename, move, and delete are also available, but remain only valid for a given user possessing the requisite permissions (as confirmed by checking the "shadow copy" permissions) before the permissions were removed. Any of these actions that are taken are audited and stored in a database that is administered by a central IIS server.

To provide additional content management features, as would be found in a full ECM, authorized end-users are able to assign a Classification value to a document, assign a Hold to a document, and assign a Disposition value to a document. Each of these are governed by user groups that are managed by the IIS server and synchronized with Microsoft Active Directory. All of these actions are audited and stored in a database that is administered by the central on-premises server. As a result, any audited actions that have been taken on a given file or folder can be viewed via the Windows File Explorer add-in, in accord with view permissions assigned to that user.

The features described earlier (check-out, check-in, audit, add, rename, move, delete, add classification, add hold, add disposition) are ones that would commonly be found in an ECM, however these features would now be available on files and folders in the NTFS file system, without the need to move data anywhere. This therefore provides an organization the ability to get its file system documents "under management", by leaving them in place where they are, regardless of the total amount of data, while maintaining the same fast speeds users are already accustomed to on their existing file system.

The server/database side of the design is such that multiple databases can be added dynamically to the system, achieving load balancing and load sharing as a result. This is important when the product is implemented at sites that have multiple databases and data stores measuring in PBs—this solution will work in such an environment.

The "shadow copy" of permissions leverages the caching of file/folder permissions via a copy of the file system that is produced, with exact copies of Windows permissions, as zero-byte files to keep the size small. This is necessary due to the complexity of Windows permissions themselves, as it was found that translating this into a database field was enormously complicated, if not impossible, to duplicate outside of the Windows OS.

Permissions removed when the initial "shadow copy" is made can be restored with the use of a tool that will effectively reinstate the "snapshot" of the permissions on the file system, if an organization wants to back out this change.

Changes to the file system access permissions has an additional benefit against the common ransomware tactic of deceiving a user into granting common Windows access to a program since administrative permissions on all files they can access is effectively removed. Such attacks are no longer possible since all such permission adjustments for end-users has been replaced by the Shinydocs In-Place Content Management system, thereby improving file system security.

FIG. 1 shows a typical networked computer system 10 according to the present invention. The system 10 includes at least one user computer device 12 and at least one server 14 connected by a network 16.

The user computer device 12 can be any computing device, such as a desktop or notebook computer, a smartphone, tablet computer, and the like. The user computer device 12 may be referred to as a computer.

The server 14 is a device such as a mainframe computer, blade server, rack server, cloud server, or the like. The server 14 may be operated by a company, government, or other organization, and may be referred to as an enterprise server or an enterprise content management (ECM) system.

The network 16 can include any combination of wired and/or wireless networks, such as a private network, a public network, the Internet, an intranet, a mobile operator's network, a local-area network, a virtual-private network (VPN), and similar. The network 16 operates to communicatively couple the computer device 12 and the server 14.

In a contemplated implementation, a multitude of computer devices 12 connect to several servers 14 via an organization's internal network 16. In such a scenario, the servers 14 store documents and other content in a manner that allows collaboration between users of the computer devices 12, while controlling access to and retention of the content. Such an implementation allows large, and often geographically diverse, organizations to function. Document versioning and/or retention may be required by some organizations to meet legal or other requirements.

The system 10 may further include one or more support servers 18 connected to the network 16 to provide support services to the user computer device 12. Examples of support services include storage of configuration files, authentication, and similar. The support server 18 can be within a domain controlled by the organization that controls the servers 14 or it can be controlled by a different entity.

The computer device 12 executes a file manager 20, a local-storage file system driver 22, a local storage device 24, a remote-storage file system driver 26, and a content management system interface 28.

The file manager 20 is configured for receiving user file commands from a user interface (e.g., mouse, keyboard, touch screen, etc.) and outputting user file information via the user interface (e.g., display). The file manager 20 may include a graphical user interface (GUI) 30 to allow a user of the computer 12 to navigate and manipulate hierarchies of folders and files, such as those residing on the local storage device 24. Examples of such include Windows Explorer and Mac OS Finder. The file manager 20 may further include an application programming interface (API) exposed to one or more applications 32 executed on the computer 12 to allow such applications 32 to issue commands to read and write files and folders. Generally, user file commands include any user action (e.g., user saves a document) or automatic action (e.g., application's auto-save feature) performed via the file manager GUI 30 or application 32 that results in access to a file. The file manager GUI 30 and API may be provided by separate programs or processes. For the purposes of this disclosure, the file manager 20 can be considered to be one or more processes and/or programs that provide one or both of the file manager GUI 30 and the API.

The local-storage file system driver 22 is resident on the computer 12 and provides access to the local storage device 24. The file system driver 22 responds to user file commands, such as create, open, read, write, and close, to perform such actions on files and folders stored on the local storage device 24. The file system driver 22 may further provide information about files and folders stored on the local storage device 24 in response to requests for such information.

The local storage device 24 can include one or more devices such as magnetic hard disk drive, optical drives, solid-state memory (e.g., flash memory), and similar.

The remote-storage file system driver 26 is coupled to the file manager 20 and is further coupled to the content management system interface 28. The file system driver 26 maps the content management system interface 28 as a local drive for access by the file manager 20. For example, the file system driver 26 may assign a drive letter (e.g., "H:") or mount point (e.g., "/Enterprise") to the content management system interface 28. The file system driver 26 is configured to receive user file commands from the file manager 20 and output user file information to the file manager 20. Examples of user file commands include create, open, read, write, and close, and examples of file information include file content, attributes, metadata, and permissions.

The remote-storage file system driver 26 can be based on a user-mode file system driver. The remote-storage file system driver 26 can be configured to delegate callback commands to the content management system interface 28. The callback commands can include file system commands such as Open, Close, Cleanup, CreateDirectory, OpenDirectory, Read, Write, Flush, GetFileInformation, GetAttributes, FindFiles, SetEndOfFile, SetAttributes, GetFileTime, SetFileTime, LockFile, UnLockFile, GetDiskFreeSpace, GetFileSecurity, and SetFileSecurity.

The content management system interface 28 is the interface between the computer 12 and the enterprise server 14. The content management system interface 28 connects, via the network 16, to a content management system 40 hosted on the enterprise server 14. As will be discussed later in this document, the content management system interface 28 can be configured to translate user commands received from the driver 26 into content management commands for the remote content management system 40.

The content management system interface 28 is a user-mode application that is configured to receive user file commands from the file manager 20, via the driver 26, and translate the user file commands into content management commands for sending to the remote content management system 40. The content management system interface 28 is further configured to receive remote file information from the remote content management system 40 and to translate the remote file information into user file information for providing to the file manager 20 via the driver 26.

The remote content management system 40 can be configured to expose an API 43 to the content management system interface 28 in order to exchange commands, content, and other information with the content management system interface 28. The remote content management system 40 stores directory structures 41 containing files in the form of file content 42, attributes 44, metadata 46, and permissions 48. File content 42 may include information according to one or more file formats (e.g., ".docx", ".txt", ".dxf", etc.), executable instructions (e.g., an ".exe" file), or similar. File attributes 44 can include settings such as hidden, read-only, and similar. Metadata 46 can include information such as author, date created, date modified, tags, file size, and similar. Permissions 48 can associate user or group identities to specific commands permitted (or restricted) for specific files, such as read, write, delete, and similar.

The remote content management system 40 can further include a web presentation module 49 configured to output one or more web pages for accessing and modifying directory structures 41, file content 42, attributes 44, metadata 46, and permissions 48. Such web pages may be accessible using a computer's web browser via the network 16.

The content management system interface 28 provides functionality that can be implemented as one or more programs or other executable elements. The functionality will be described in terms of distinct elements, but this is not to be taken as limiting or exhaustive. In specific instances not all of the functionality needs to be implemented.

The content management system interface 28 includes an authentication component 52 that is configured to prompt a user to provide credentials for access to the content management system interface 28, and for access to the remote content management system 40. Authentication may be implemented as a username and password combination, a certificate, or similar, and may include querying the enterprise server 14 or the support server 18. Once the user of the computer device 12 is authenticated, he or she may access the other functionality of the content management system interface 28.

The content management system interface 28 includes control logic 54 configured to transfer file content between the computer 12 and the server 14, apply filename masks, evaluate file permissions and restrict access to files, modify file attributes and metadata, and control the general operation of the content management system interface 28. The control logic 54 further effects mapping of remote paths located at the remote content management system 40 to local paths presentable at the file manager 20. Path mapping permits the user to select a file via the file manager 20 and have file information and/or content delivered from the remote content management system 40. In one example, the remote files and directories are based on a root path of "hostname/directory/subdirectory" that is mapped to a local drive letter or mount point and directory (e.g., "H:/hostname/directory/subdirectory").

The content management system interface 28 includes filename masks 56 that discriminate between files that are to remain local to the computer 12 and files that are to be transferred to the remote content management system 40. Temporary files may remain local, while master files that are based on such temporary files may be sent to the remote content management system 40. This advantageously prevents the transmission of temporary files to the remote content management system 40, thereby saving network bandwidth and avoiding data integrity issues (e.g., uncertainty and clutter) at the remote content management system 40.

The content management system interface 28 includes a cache 58 of temporary files, which may include working versions of files undergoing editing at the user computer device 12 or temporary files generated during a save or other operating of an application 32.

The content management system interface 28 includes an encryption engine 59 configured to encrypt at least the cache 58. The encryption engine 59 can be controlled by the authentication component 52, such that a log-out or time out triggers encryption of the cache 58 and successful authentication triggers decryption of the cache 58. Other informational components of the content management system interface 28 may be encrypted as well, such as the filename masks 56. The encryption engine 59 may conform to an Advanced Encryption Standard (AES) or similar.

Figure 2:
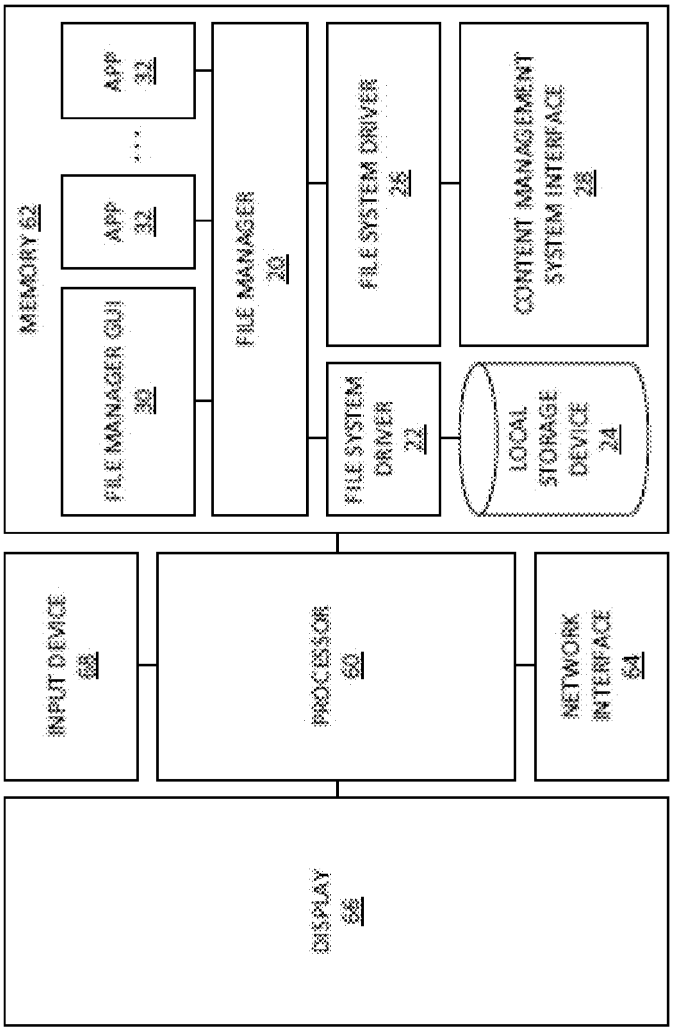
FIG. 2 is a block diagram of a user computer device.

FIG. 2 shows an example of a user computer device 12. The computer device 12 includes a processor 60, memory 62, a network interface 64, a display 66, and an input device 68. The processor 60, memory 62, network interface 64, display 66, and input device 68 are electrically interconnected and can be physically contained within a housing or frame.

The processor 60 is configured to execute instructions, which may originate from the memory 62 or the network interface 64. The processor 60 may be known a CPU. The processor 60 can include one or more processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the client computer (e.g., fixed hard drives) as well as removable components (e.g., removable memory cards). The memory 62 allows for random access, in that programs and data may be both read and written.

The network interface 64 is configured to allow the user computer device 12 to communicate with the network 16 (FIG. 1). The network interface 64 can include one or more of a wired and wireless network adaptor and well as a software or firmware driver for controlling such adaptor.

The display 66 and input device 68 form a user interface that may collectively include a monitor, a screen, a keyboard, keypad, mouse, touch-sensitive element of a touch-screen display, or similar device.

The memory 62 stores the file manager 20, the file system driver 26, and the content management system interface 28, as well as other components discussed with respect to FIG. 1. Various components or portions thereof may be stored remotely, such as at a server. However, for purposes of this description, the various components are locally stored at the computer device 12. Specifically, it may be advantageous to store and execute the file manager 20, the file system driver 26, and the content management system interface 28 at the user computer device 12, in that a user may work offline when not connected to the network 16. In addition, reduced latency may be achieved. Moreover, the user may benefit from the familiar user experience of the local file manager 20, as opposed to a remote interface or an interface that attempts to mimic a file manager.

Architecture

Figure 3:
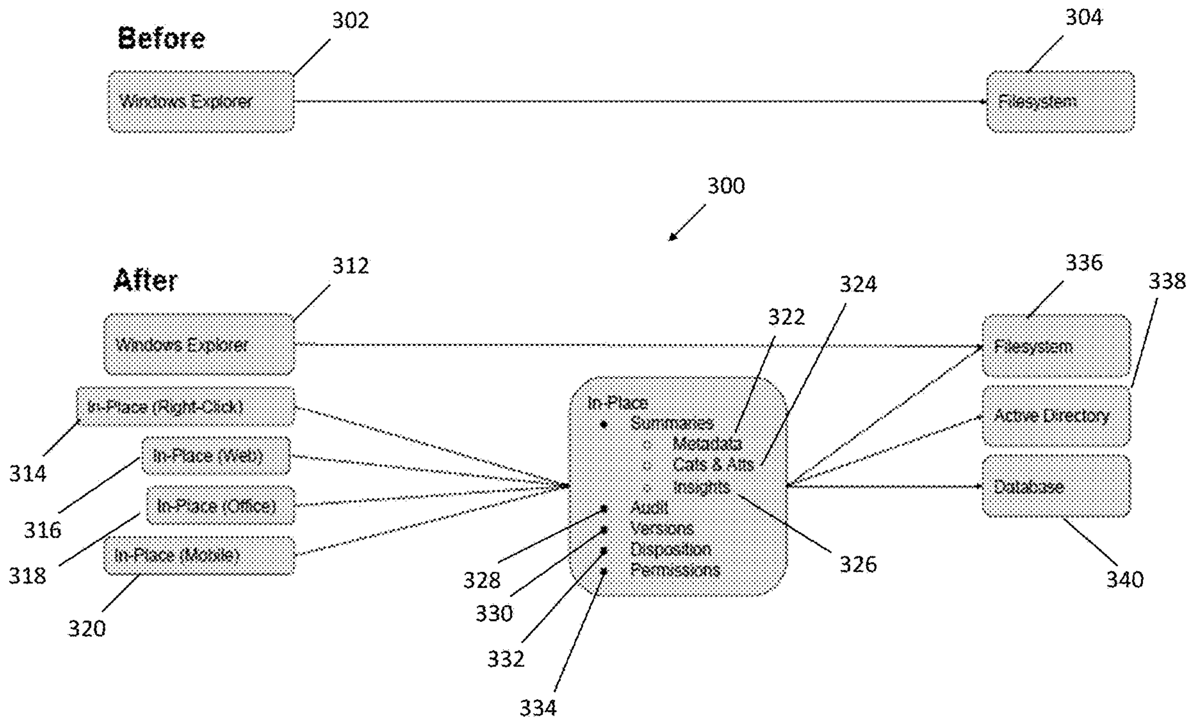
FIG. 3 is a diagram of an exemplary architecture of an in-place content management system.

FIG. 3 is a diagram of an exemplary architecture of an in-place content management system. According to FIG. 3, this diagram illustrates the "Before" and "After" architecture for an end-user. Initially, an end-user would use Windows File Explorer 302 to access their file system.

The After scenario is with an In-Place Content Management system 300 implemented. According to FIG. 3, in the After scenario, there will be an In-Place menu that users will have access to via a Right-Click menu 314 (if on Windows File Explorer 312), or a Web experience (if interacting via a Web browser 316), or a Microsoft Office Add-In 318 (if using any of the Microsoft Office applications, such as Word, Excel, PowerPoint or Visio), or via an application if on a mobile device 320 (such as iOS or Android). By using any of these interfaces, users will have access to summaries of metadata 322, categories and attributes 324 or insights 326, as well as audit 328, versions 330, disposition 332, and permission information 334. Furthermore, the In-Place Content Management system 300 will impact the Filesystem 336, Active Directory structure 338 and Database 340.

Database Schema

Figure 4:
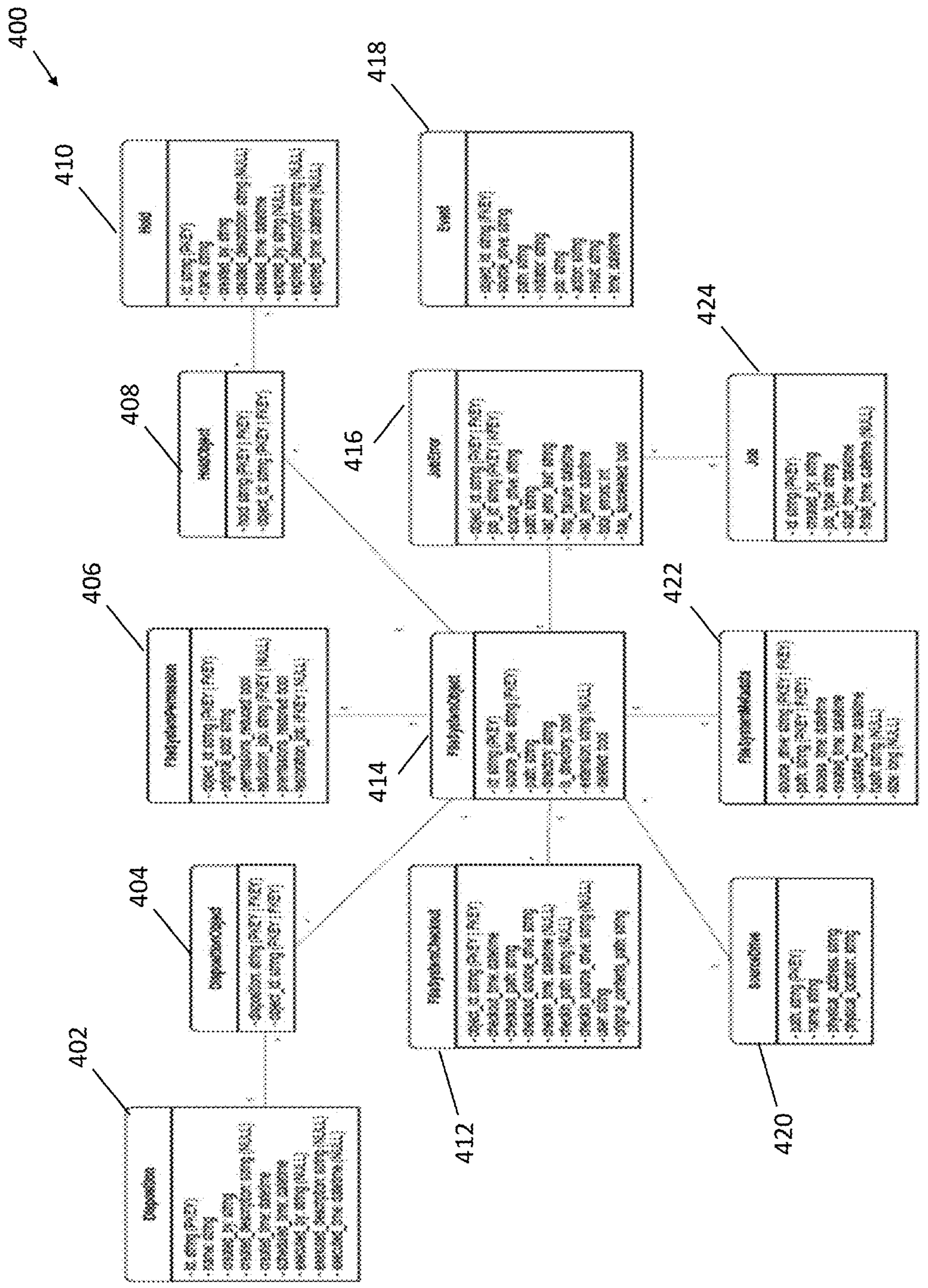
FIG. 4 is a diagram of an exemplary database schema of an in-place content management system.

FIG. 4 is a diagram of an exemplary database schema of an in-place content management system. This is an entity relationship diagram for the database schema that supports In-Place Content Management.

According to FIG. 4, the database schema 400 may include the following tables:

Disposition 402
DispositionObject 404
FileSystemPermission 406.
HoldObject 408
Hold 410.
FileSystemCheckout 412
FileSystemObject 414
JobError 416
Event 418
SourceDrive 420.
FilfeSystemMetadata 422
Job 424

GUI Snapshot

Figure 5:
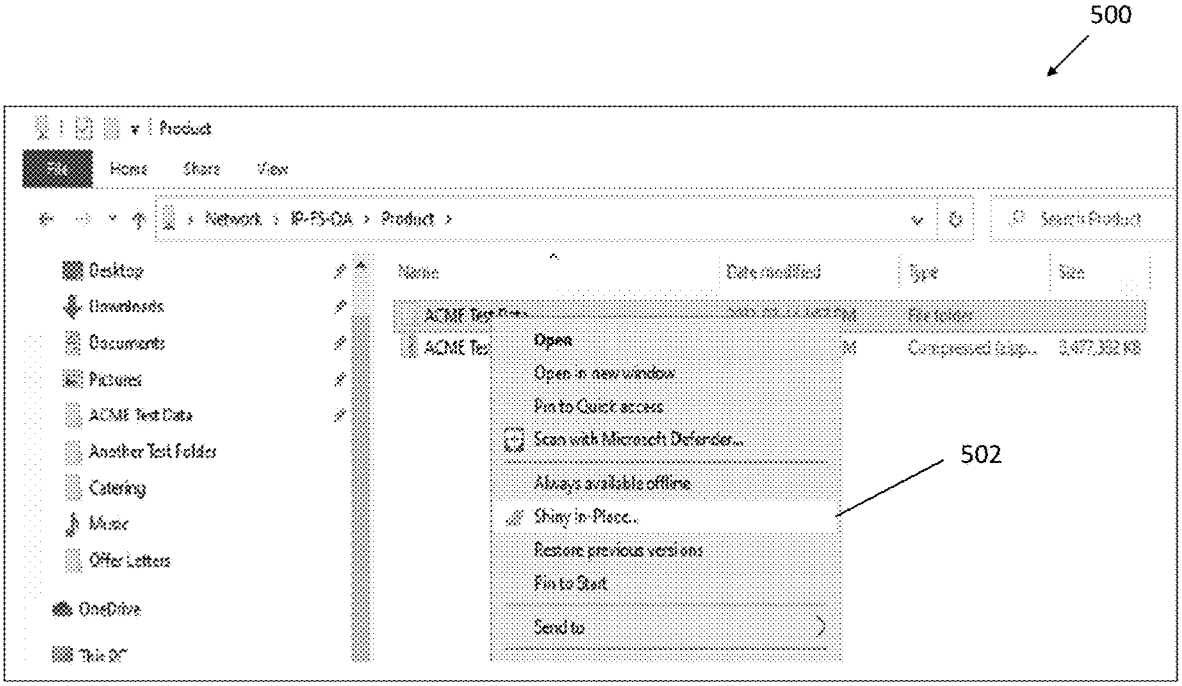
FIG. 5 is a screenshot illustrating an exemplary graphical user interface of an in-place content management system

FIG. 5 is a screenshot illustrating an exemplary graphical user interface of an in-place content management system. According to FIG. 5, the In-Place Content Management example 500 is via a Windows File Explorer add-in. To launch the application, if an end-user has the In-Place Content Management Windows Explorer add-in installed, by simply navigating to a folder that has been added to In-Place Content Management, the "Shiny In-Place" menu 502 will appear in the right-click menu. If displayed, simply click on this item to continue.

Check-Out Snapshot

Figure 6:
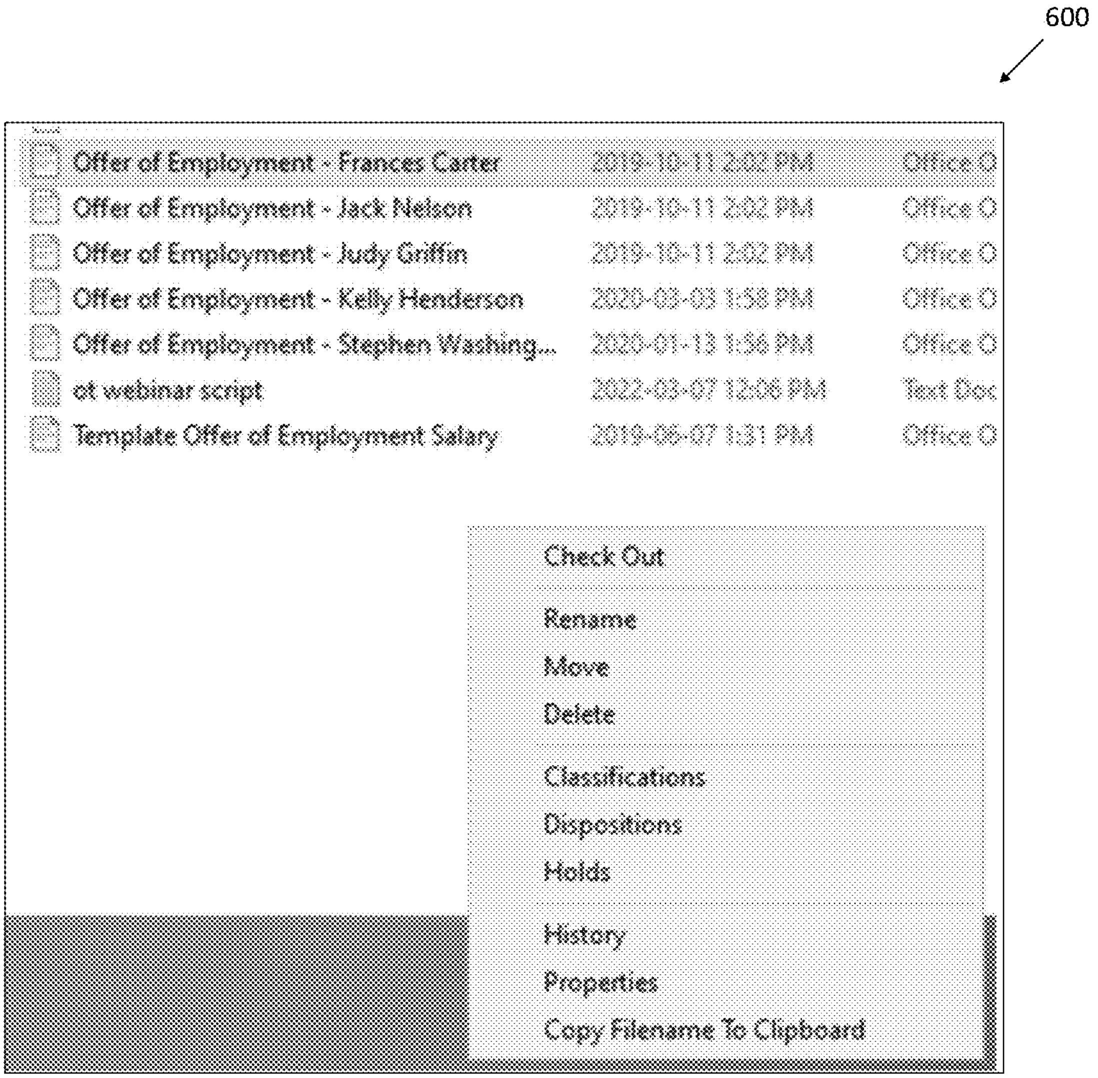
FIG. 6 is a screenshot illustrating Check-Out a file.

FIG. 6 is a screenshot illustrating Check-Out file feature. According to FIG. 6, the general concept of screenshot 600 includes a File Share that has In-Place Content Management on it-all content (including the file clicked on) is prevented from modification (editing), until a given user (with sufficient permissions before it was placed under management) checks it out.

Before the user can edit a document, they simply select Check Out the file via the "In-Place" menu, then they can edit it normally. Once checked out, one can interface with the document as normal (editing with a file editing application (e.g., Microsoft Word, Excel, PowerPoint, etc.) on their Windows machine). Once completed, selecting the Check In option will once again place the document under management. Also, if one happens to view the In-Place menu for a document that is checked out by someone else, one will see their name beside Checked Out By in the In-Place menu.

Add New Document Snapshots

Figure 7A:
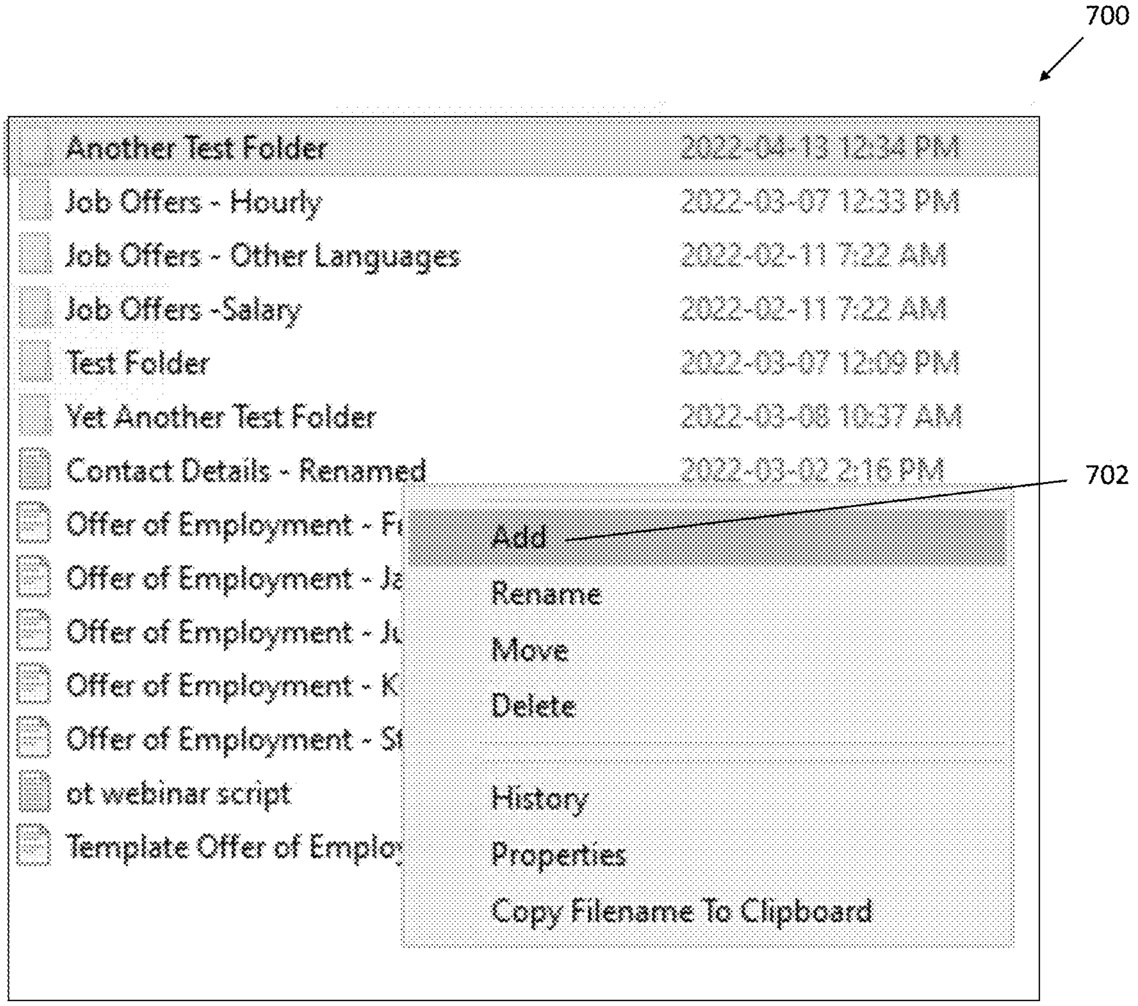
FIGS. 7A and 7B are screenshots illustrating Adding a New Document.
Figure 7B:
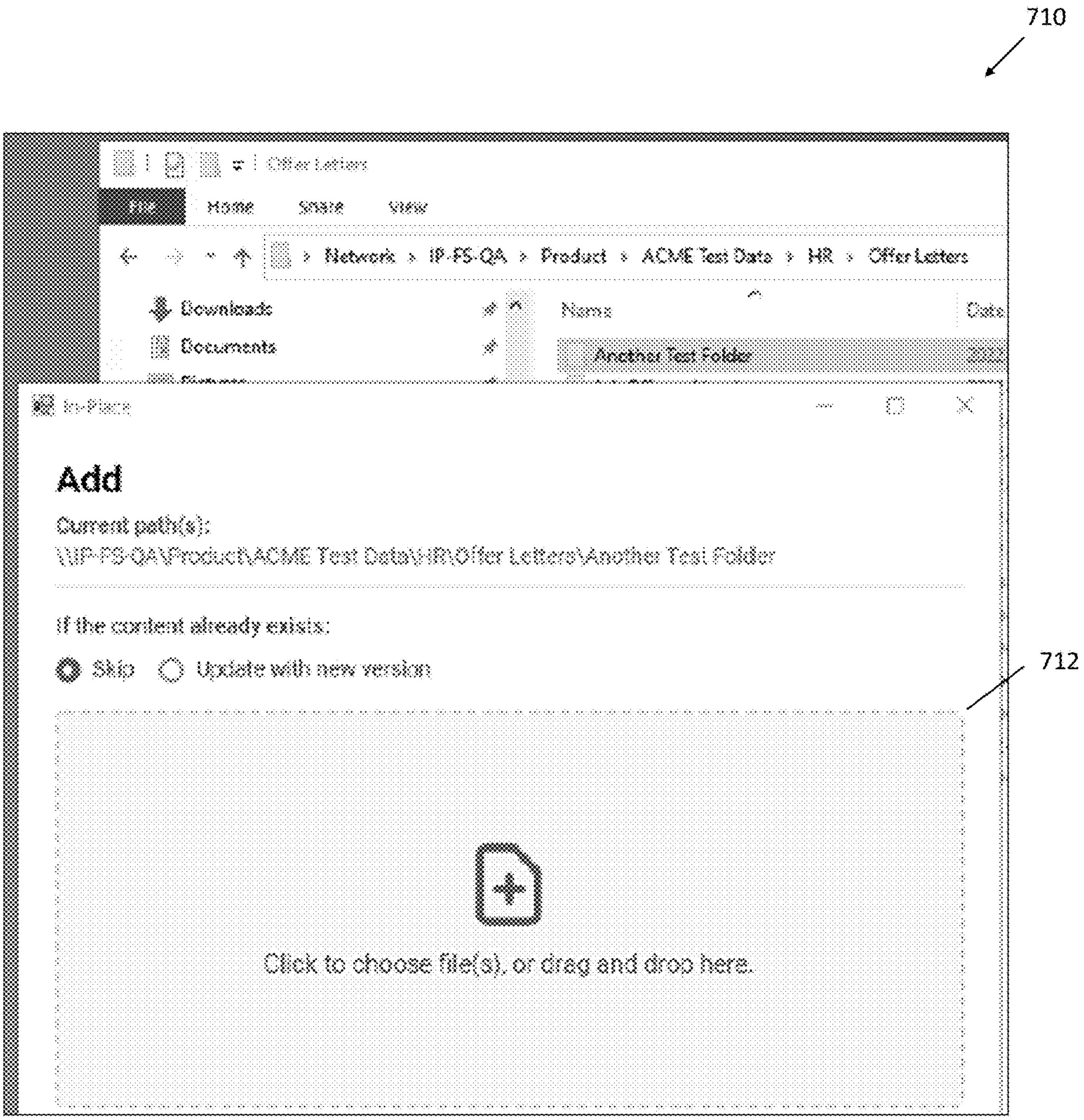

FIGS. 7A and 7B are screenshots illustrating Adding a New Document. According to FIG. 7A, the normal way to add documents is to navigate up to the containing Folder in the screenshot 702 and once there, select Add 702 from the In-Place menu, which will in turn display the In-Place Add Window 702.

According to FIG. 7B, once this screenshot 710 appears, simply drag and drop files or folders from somewhere else (i.e., from the desktop or another file system) into the Share 712. A confirmation message such as "Successfully added content!" will appear after the upload is complete.

Renaming Snapshots

Figure 8A:
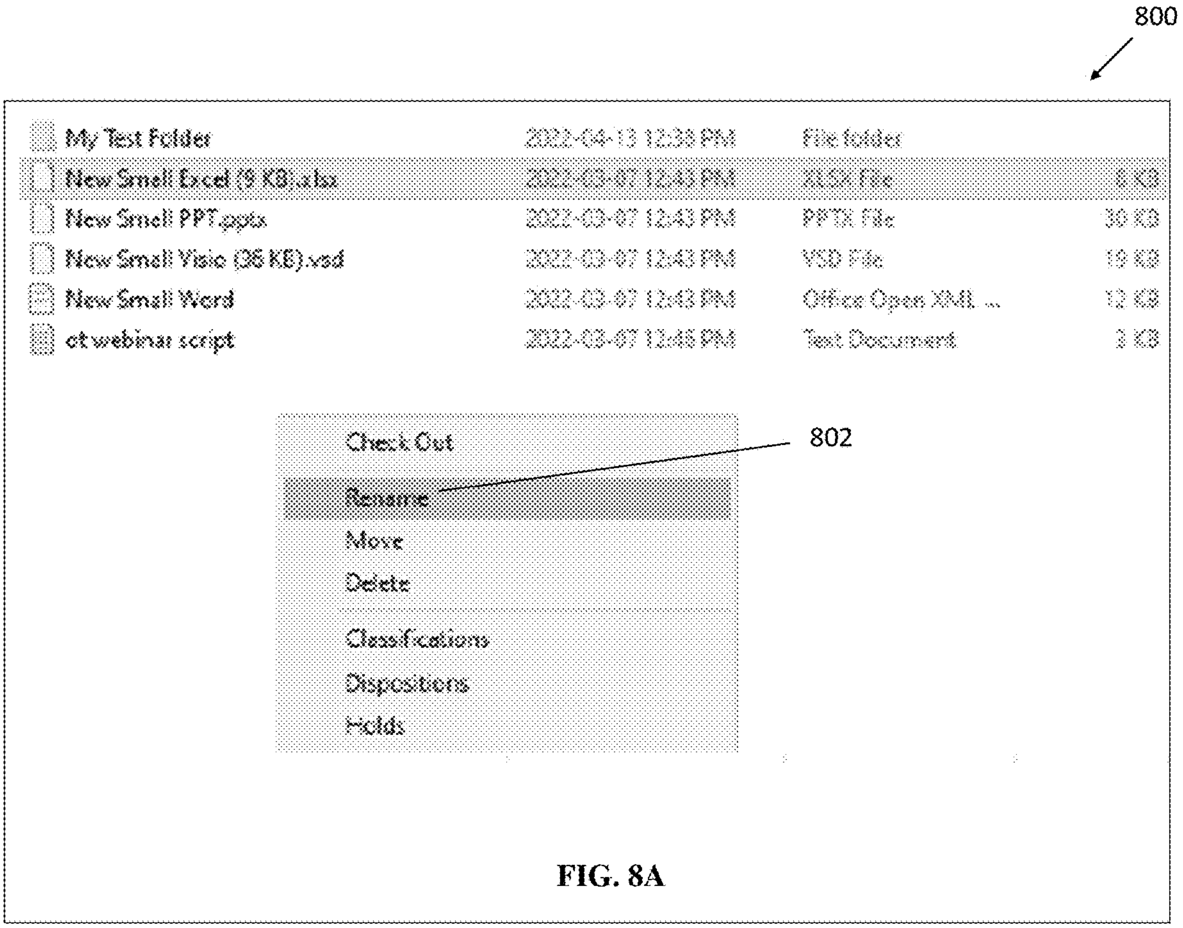
FIGS. 8A and 8B are screenshots illustrating Renaming actions.
Figure 8B:
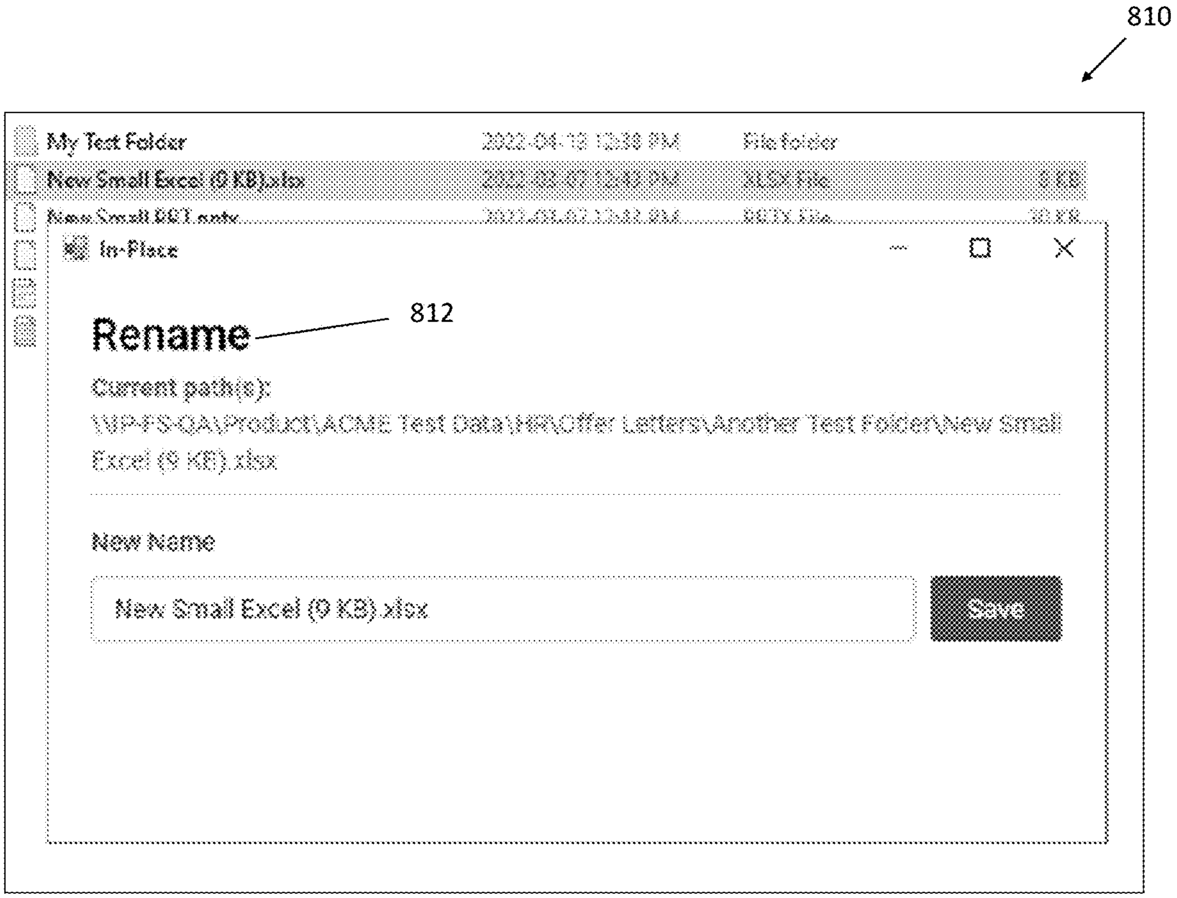

FIGS. 8A and 8B are screenshots illustrating Renaming actions. Renaming actions includes renaming a file or folder or moving or deleting a file or folder. According to screenshot 800 in FIG. 8A, to rename a file or folder, select "Rename" 802 from the In-Place menu, which will in turn display the In-Place Rename Window. Once the user sees this Window, click on the New Name field, change the name of the file or folder as you like and click "Save" when done, which is illustrated in FIG. 8B in screenshot 810. The functions of Move and Delete behave in similar fashion to Rename 812.

Classifications Snapshots

Figure 9A:
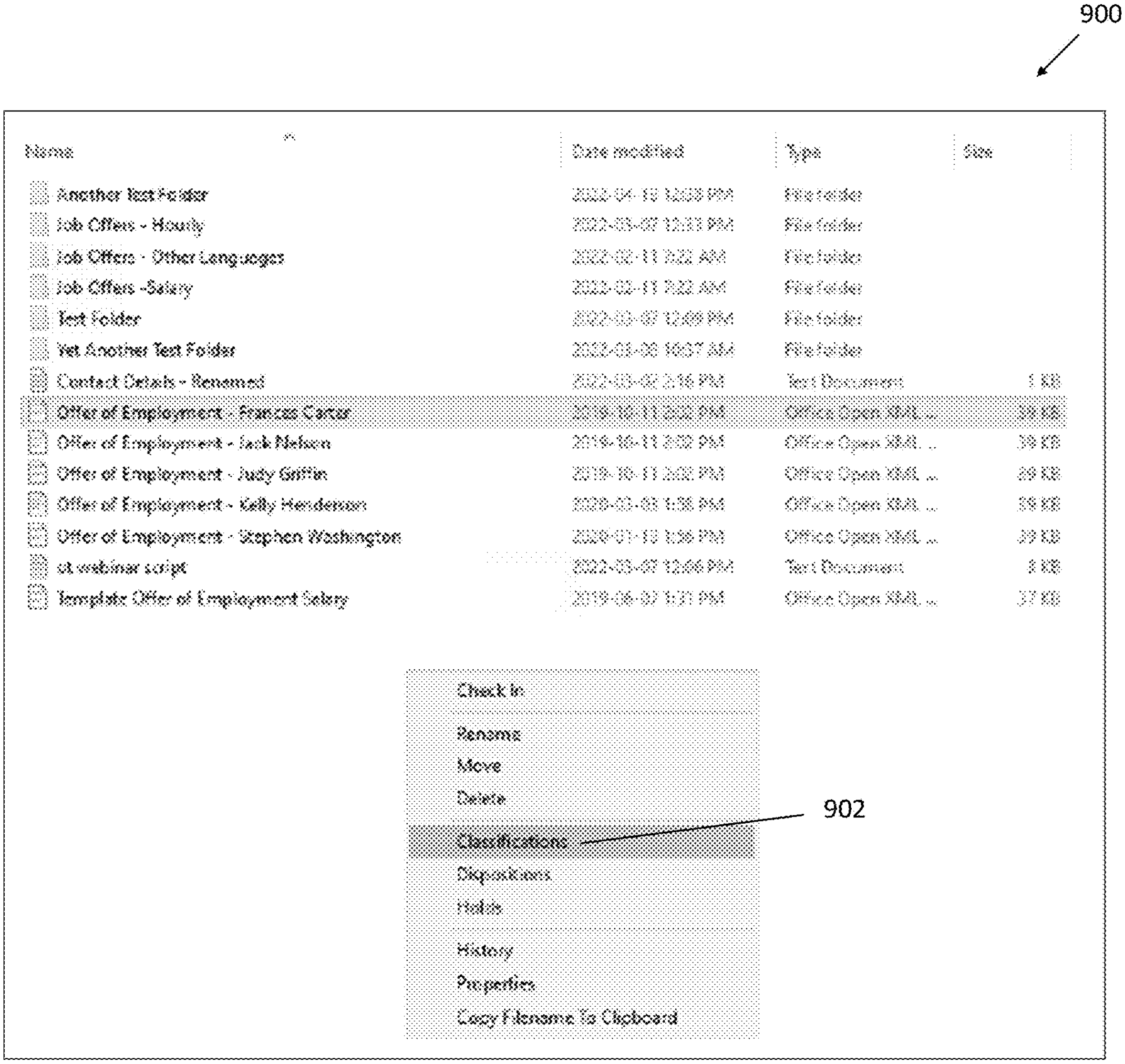
FIGS. 9A and 9B are screenshots illustrating Classifications actions.
Figure 9B:
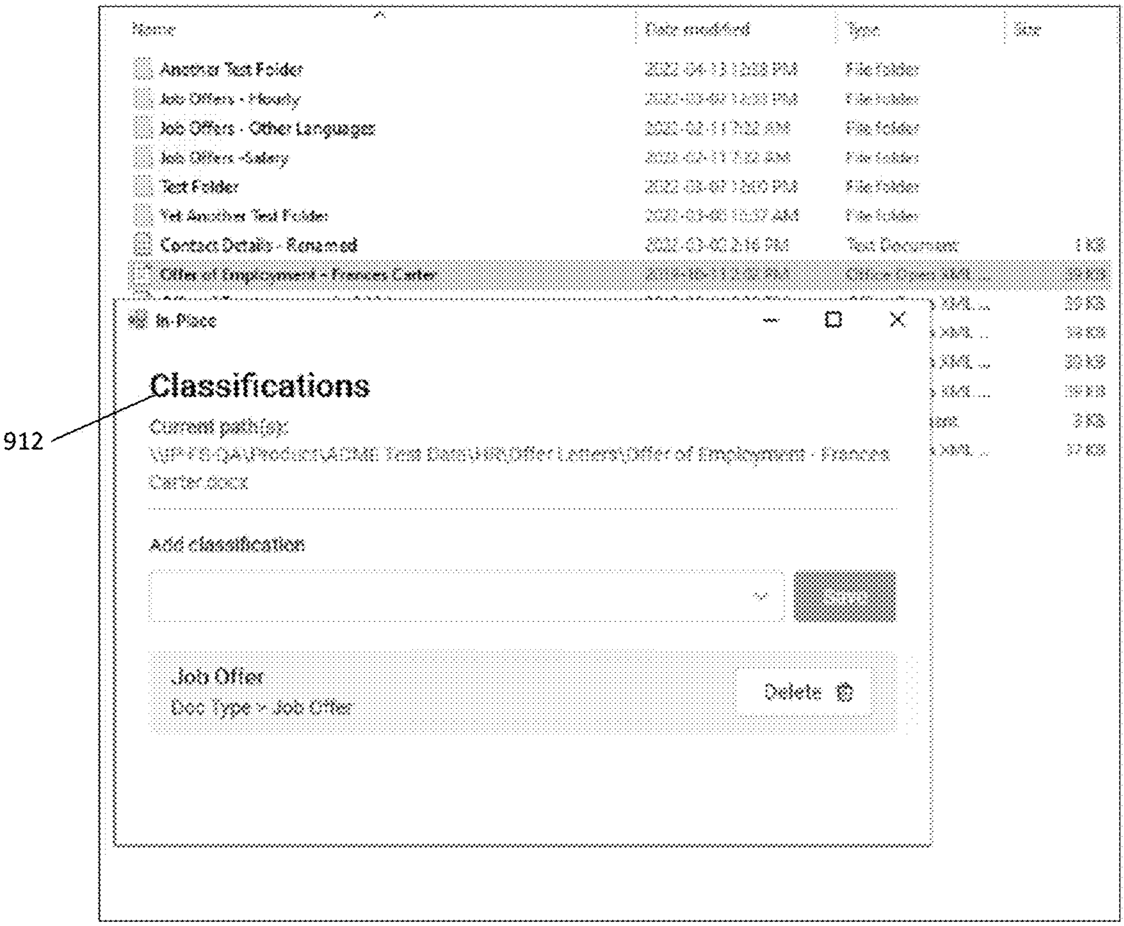

FIGS. 9A and 9B are screenshots illustrating Classifications actions. Only users who are allowed to apply Classifications to a document will see this option. When clicked on, this will display the In-Place Classifications menu 902, from which one can then select one of the available drop-down values, as shown in FIG. 9A in screenshot 900.

Once the user selects "Save", the view is updated to show the selection, as shown in screenshot 910 in FIG. 9B. From then on, whenever any user selects "Classifications" 912 (from the menu) for this document, they will see the classification value(s) that were assigned to it-regardless of who assigned them.

Dispositions Snapshots

Figure 10A:
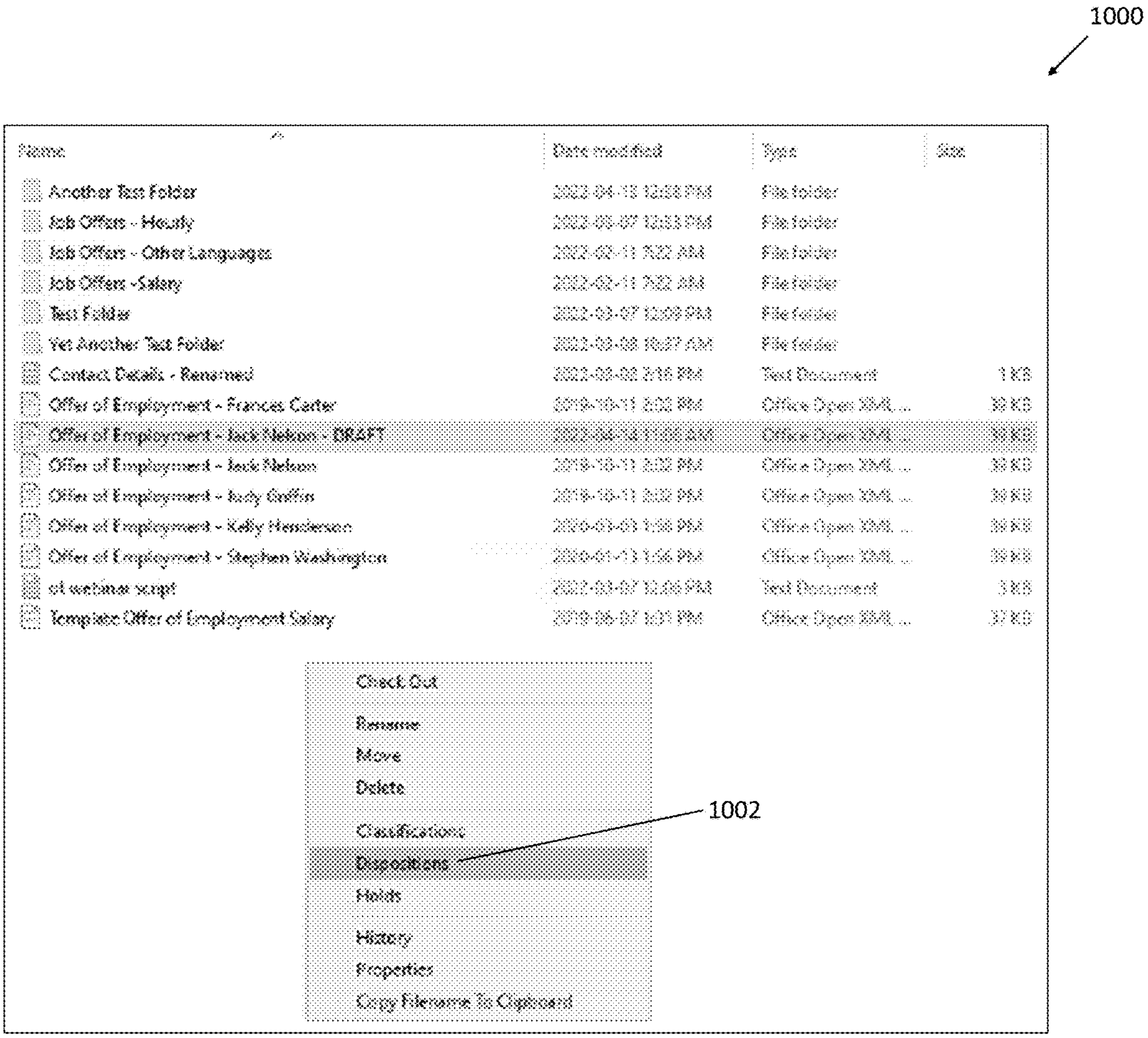
FIGS. 10A and 10B are screenshots illustrating Dispositions actions.
Figure 10B:
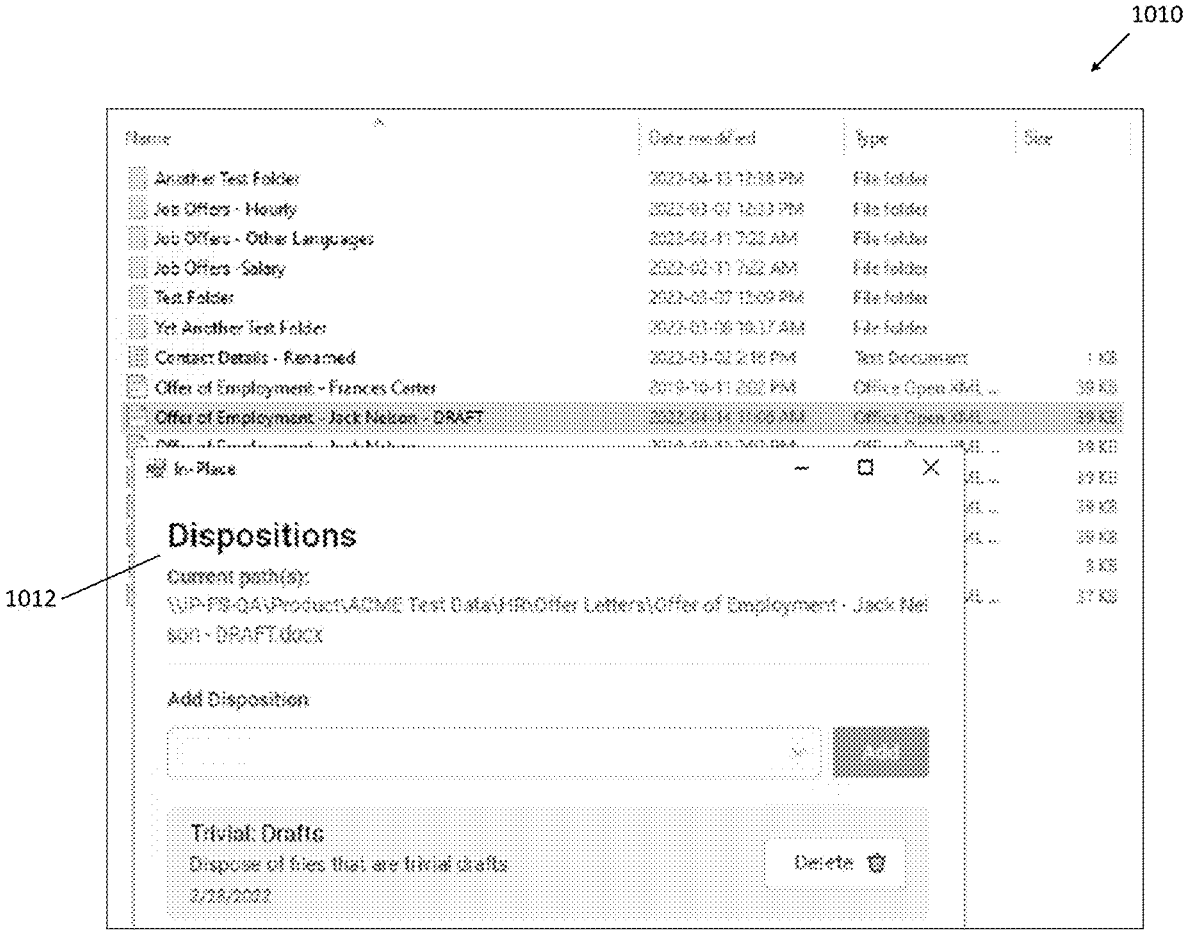

FIGS. 10A and 10B are screenshots illustrating Dispositions actions. Only users who are allowed to assign Dispositions to a document will see this option. According to screenshot 1000 in FIG. 10A, when clicked on, this will display the In-Place "Dispositions" menu 1002, from which one can then select one of the available drop-down values.

Once a selection is saved, the view is updated to show that selection, as shown in screenshot 1010 in FIG. 10B. From then on, whenever any user selects "Dispositions" 1012 for this document, they will see the disposition value(s) that were assigned to it-regardless of who assigned them. Multiple Dispositions can be assigned to a given document.

Holds Snapshots

Figure 11A:
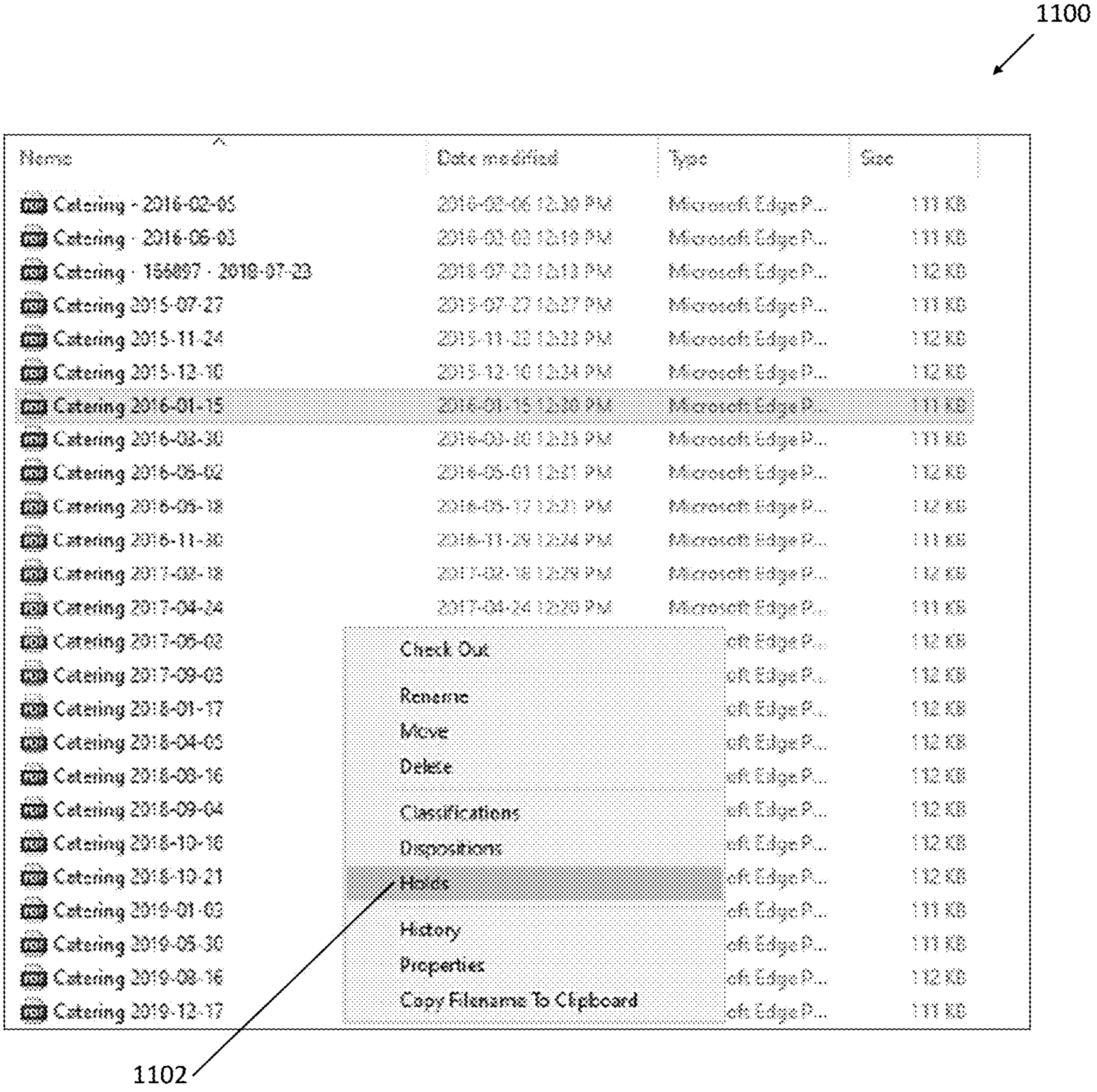
FIGS. 11A and 11C are screenshots illustrating Holds actions.
Figure 11B:
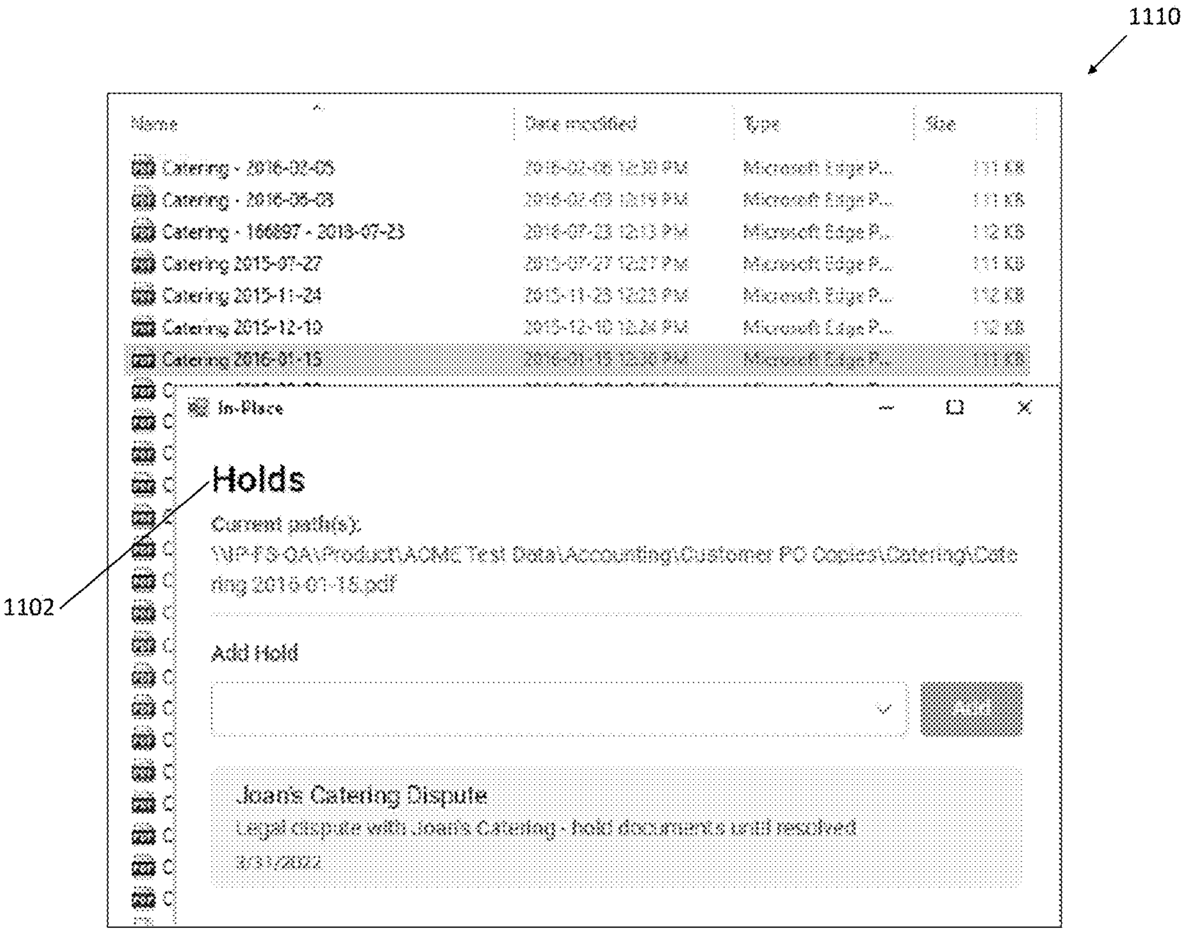
Figure 11C:
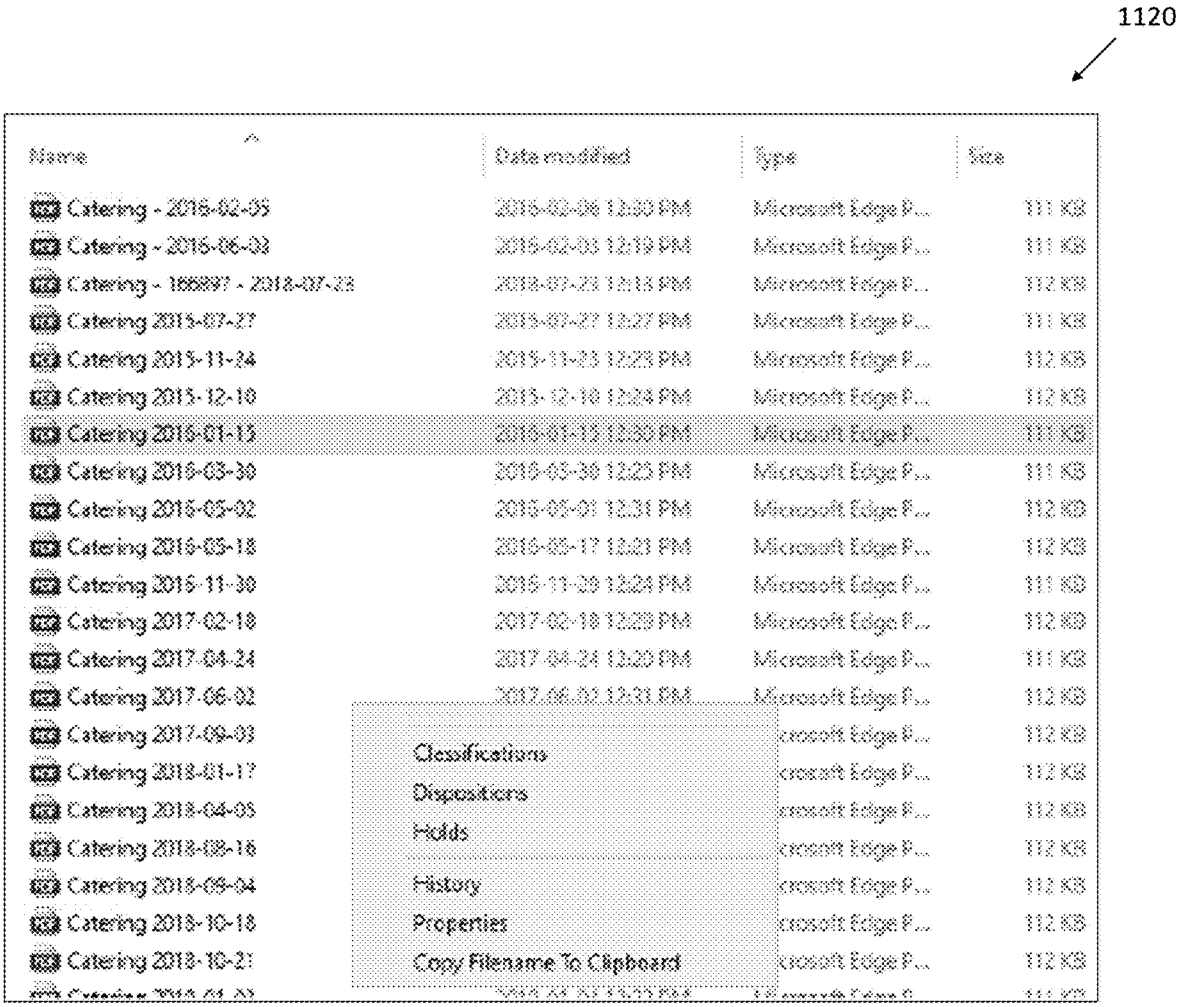

FIGS. 11A and 11C are screenshots illustrating Holds actions. Only users who are allowed to apply Holds to a document will see this option. According to screenshot 1100 in FIG. 11A, when clicked on, this will display the In-Place "Holds" menu 1102, from which one can then select one of the available drop-down values.

According to screenshot 1110 in FIG. 11B, once a selection is Saved, the view is updated to show the selection. From then on, whenever any user selects "Holds" 1112 for this document (or other documents), they will see the hold value(s) that were assigned to it-regardless of who assigned them. Multiple Holds can be assigned to a given document.

Note that once a Hold is applied to a given document, that Hold may not be removed—an Administrator would need to take that action. Furthermore, once a document has a Hold placed in it, it may no longer be checked out, renamed, moved or deleted (i.e., it is locked from further editing). This can be seen by those options being removed from the In-Place Content Management menu, as shown in screenshot 1120 in FIG. 11C.

Audit Trail Snapshot

Figure 12:
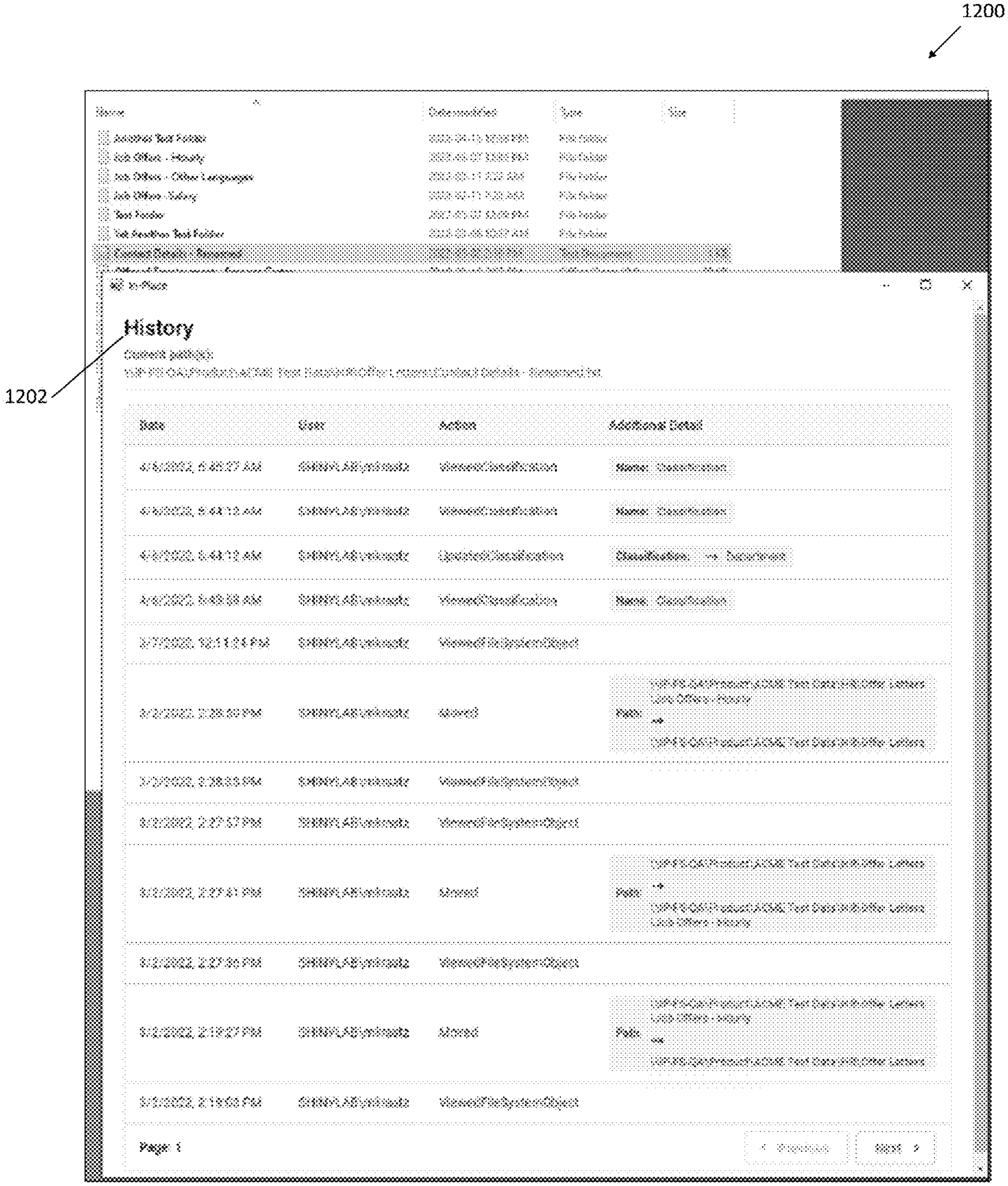
FIG. 12 is a screenshot illustrating Audit Trail actions.

One of the advantages of the In-Place Content Management product is that there is an audit trail recorded for all significant actions taken on a given document. FIG. 12 is a screenshot illustrating Audit Trail actions. According to screenshot 1200 of FIG. 12, to see the audit trail, click on History 1202 which will show the In-Place History page for this document. According to FIG. 12, each entry has a date/time stamp, the user that performed the action, the action they took and any additional relevant detail, if applicable.

Further Snapshots

According to this disclosure and future embodiments, the following scenarios or snapshots are also envisioned.

Snapshot1: Snapshot a Network Drive

According to the disclosure, a snapshot of a network drive may include the following:

- An Administrator is able to crawl the contents on a given network drive, storing the drive metadata in a database,
- Permissions information (users and groups) for each file and folder crawled are stored on a network drive in a "shadow copy" which consists of an exact copy of the drive structure and permissions, but with all zero-byte files,
- An Administrator is able to easily identify errors encountered during a network drive crawl in order to rectify the error(s),
- A reviewable audit will exist that can be used to verify which drives, folders, or files were crawled by whom and when,
- An Administrator is able to verify that the In-Place database (for a given network drive) matches what is on a given network drive at a point in time,
- The In-Place database will be secure and unable to be modified without proper levels of authorization,
- An Administrator is able to view a summary of what is in the In-Place database (for a given network drive) via a graphical user interface,
- An Administrator is able to record a set of any number of network drives and authentications for those drives for authentication/crawling,
- An Administrator is able to view a summary of what is in the In-Place database, by selecting a given network drive, or sets of drives, or all drives via a graphical user interface.

Snapshot 2: Lock Down a Network Drive

According to the disclosure, a snapshot of a lock down of a network drive may include the following:

- Authenticate as a user with heightened authorization against a given network drive for the purpose of adjusting file and folder permissions,
- A heightened authorized Administrator is able to automatically reduce the permissions on a given network drive for each folder and file, removing all but the ability to read,
- Before any permissions are reduced on any file or folder, that the In-Place "shadow copy" permissions matches what is on the network drive files/folders will be verified,
- The process by which permissions are reduced will be re-startable, skipping items already done,
- An Administrator is able to easily identify errors encountered during reducing permissions on a network drive in order to rectify the error(s),
- A reviewable audit will exist that can be used to verify which drives, folders, or files had permissions reduced by whom and when,
- An Administrator is able to view an enhanced summary (which objects had permissions reduced) of what is in the In-Place database (for a given network drive) via a graphical user interface,
- An Administrator is able to view an enhanced summary (which objects had permissions reduced) of what is in the In-Place database, by given network drive, or for sets of drives, or for all drives via a graphical user interface.

Snapshot 3: Restore Permissions on a Network Drive

According to the disclosure, restoring a snapshot of permissions of a network drive may include the following:

- Ability for an Administrator to run as an elevated user to restore the permissions on a given network drive file to what they were before the permissions were reduced,
- Before any permissions are restored on any file, that the In-Place database (for a given network drive) matches what is on the network drive for that file will be verified,
- That the file permissions that were restored will be as per those stored in the network drive "shadow copy" for that object,
- An Administrator is able to easily identify errors encountered during restoring file permissions on a network drive in order to rectify the error(s),
- A reviewable audit will exist that can be used to verify which drive and files had permissions restored by whom and when,
- An Administrator is able to view an enhanced summary (which file had permissions restored) of what is in the In-Place database (for a given network drive) via a graphical user interface,
- The process by which permissions are restored for a set of files will be re-startable, skipping items already done,
- An Administrator is able to view an enhanced summary (which files had permissions restored) of what is in the In-Place database, by a given network drive, or for sets of drives, or for all drives via a graphical user interface
- An Administrator is able to view an enhanced summary (which files had permissions restored) of what is in the In-Place database, by a given network drive, or for sets of drives, or for all drives via a graphical user interface,
- A heightened authorized Administrator is able to use the In-Place database and the network drive "shadow copy" (for a given network drive) to restore the permissions on a given network drive folder (including all contained folders and files) to what they were before the permissions were reduced,
- Before any permissions are restored on any folder, that the In-Place database (for a given network drive) metadata matches what is on the network drive folder (including all contained folders and files) will be verified,
- That the folder (including all contained folders and files) permissions were restored will be recorded in the In-Place database (for a given network drive) for those objects,
- An Administrator is able to easily identify errors encountered during restoring folder (including all contained folders and files) permissions on a network drive in order to rectify the error(s),

- A reviewable audit will exist that can be used to verify which drive and folder (including all contained folders and files) had permissions restored by whom and when,
- An Administrator is able to view an enhanced summary (which folder (including all contained folders and files) had permissions restored) of what is in the In-Place database (for a given network drive) via a graphical user interface,
- A heightened authorized Administrator is able to schedule the automated folder (including all contained folders and files) permission restore for a set of folders on network drives,
- The process by which permissions are restored for a set of folders (including all contained folders and files) will be re-startable, skipping items already done,
- An Administrator is able to view an enhanced summary (which folders, including all contained folders and files, had permissions restored) of what is in the In-Place database (for a given network drive), by given network drive, or sets of drives, or all drives via a graphical user interface.

Snapshot 4: Check-Out and Check-In

According to the disclosure, a snapshot of check-in and check-out feature may include the following:

- A desktop user is able to "check-out" a given file that they can see on a locked-down network drive via an add-in for Windows File Explorer (or equivalent navigation method),
- A desktop user will not be able to "check-out" a given file if the file is already "checked-out" by another user,
- A desktop user will not be able to "check-out" a given file if they do not have such permissions on the file,
- A desktop user is able to "check-out" a given file either as themselves (default) or as a group that they are a member of (both of these as determined by Active Directory), which is recorded in the In-Place database (for that given file),
- A desktop user will be able to add a short text description (if desired) to go along with the "check-out" action via an add-in for Windows File Explorer (or equivalent navigation method)
- Upon completing the "check-out", the file will automatically be marked as "checked-out" in the In-Place database (for that given file),
- Audit: A reviewable audit will exist that can be used to verify the current state of any file in the In-Place database (i.e., which are currently "checked-out"—as well as an audit history of any "check-outs" that were done-by whom and when),
- A desktop user is only able to "check-in" a given file that is in a "checked-out" state (by themselves or as a group they are a member of) in the In-Place database (for that given file) via an add-in for Windows File Explorer (or equivalent navigation method),
- Upon "check-in" a desktop user is able to update the short text description (if desired) to go along with the "check-in" action via an add-in for Windows File Explorer (or equivalent navigation method),
- Upon completing the "check-in", the "checked-out" state on the file will be removed in the In-Place database (for that given file),
- Upon completing the "check-in", permissions on the file in the network drive are restored to what was previously recorded in the In-Place "shadow copy" for that file (i.e. all but read permissions removed),
- Upon opening a given file in the Microsoft Office suite of Products (Word, Excel, PowerPoint and Visio), a desktop user is able to "check-out" the file on a locked-down network drive via an add-in for Microsoft Office,
- Upon opening a given file via Microsoft Office, a desktop user will not be able to "check-out" a given file if the file is already "checked-out" by another user,
- Upon opening a given file via Microsoft Office, a desktop user will not be able to "check-out" a given file if they do not have such permissions on the file,
- Upon opening a given file via Microsoft Office that they are not able to "check-out", it will be opened in "read only" mode in Microsoft Office,
- Upon opening a given file via Microsoft Office, a desktop user is able to "check-out" a given file either as themselves (default) or as a group that they are a member of (both of these as determined by Active Directory), which is recorded in the In-Place database (for that given file),
- Upon opening a given file via Microsoft Office, a desktop user will be able to add a short text description (if desired) to go along with the "check-out" action via an add-in for Microsoft Office,
- Upon closing a given file in the Microsoft Office suite of Products (Word, Excel, PowerPoint and Visio), a desktop user is able to "check-in" the file that is in a "checked-out" state in the In-Place database (for that given file) via an add-in for Microsoft Office,
- Upon closing a given file via Microsoft Office, a desktop user is only able to 'check-in" the file if it is "checked-out" by either themselves, or as a group that they are a member of (both of these as determined by Active Directory),
- Upon "check-in" via Microsoft Office, a desktop user is able to update the short text description (if desired) to go along with the "check-in" action via an add-in for Microsoft Office.

Snapshot 5: Support Network Drive Inherent File Features for NTFS File Systems

According to the disclosure, a snapshot of network drive inherent file features for NTFS file systems may include the following:

- A desktop user is able to add, rename, move, or delete any file if their original network drive permissions allowed these actions on the file(s) in question.
- For an "add", via a Windows pop-up (or equivalent method), the desktop user will be able to select file(s) to add to the selected folder location. The In-Place database for the given file(s) will be updated to record the addition of these files. An actual add of the file(s) will be done on the network drive, as will an equivalent add of "shadow copies" of the file(s) on the "shadow copy" network drive. Permissions will be inherited from the containing folder.
- That the file(s) were added will be recorded in an audit entry showing by whom and when the add was done.
- For a "rename", via a Windows pop-up (or equivalent method), the desktop user will be able to specify a new name for the selected file. If this new name is valid (e.g.: does not already exist in this folder for example), upon saving—the In-Place database (for the given file) will be updated to match the new value. The network drive will also be updated with the new file name, as will be the equivalent file entry in the "shadow copy" network drive.
- That the file was renamed will be recorded in an audit entry showing by whom and when the rename was done (and what the old and new values were).

- For a "move", via a Windows pop-up (or equivalent method) the desktop user will be able to browse to and select a new location for the selected file. If this new location is valid (e.g.: a file with the same name does not already exist in the new location, for example), upon saving—the In-Place database (for the given file) will be updated to match the new location for the file. An actual move of the file will be done on the network drive, as will an equivalent move of the "shadow copy" of the file on the "shadow copy" network drive.
- That the file was moved will be recorded in an audit entry showing by whom and when the move was done (and what the old and new locations were).
- Note that a move operation of a file to a non-controlled network drive (or other storage) may or may not be supported via an Administrator setting to allow or disallow this.
- For a "delete", via a Windows pop-up (or equivalent method) the desktop user will be able to confirm (or cancel) their intention to delete the selected file. If confirmed, the In-Place database (for the given file) will be updated to record the delete for the file. An actual delete of the file will be done on the network drive, as will an equivalent delete of the "shadow copy" of the file on the "shadow copy" network drive.
- That the file was deleted will be recorded in an audit entry showing by whom and when the delete was done.

Snapshot 6: Classifications

According to the disclosure, a snapshot of classifications may include the following:

- A network administrator is able to authorize a user or group to be able to "manage classifications".
- A user that is able to manage classifications may create a new named "classification" via an Administration interface. Such a classification will have a name and a hierarchy (i.e. a given classification may have classifications beneath it-so the classification of "books" might have classifications beneath if of "fiction" and "non-fiction" for example).
- A user that is able to manage classifications may view all files or folders that have a given named "classification" placed on them via an Administration interface.
- A user that is able to manage classifications is able to assign a named classification on a given file (or folder) either as themselves (default) or as a group that they are a member of (both of these as determined by Active Directory), that they can see on a locked-down network drive via an add-in for Windows File Explorer (or equivalent navigation method). This assignment is recorded in the In-Place database (for the given file or folder (including all files in the folder)).
- A reviewable audit will exist that can be used to verify the current state of any file in the In-Place database (i.e. which are currently have one or more assigned classifications—as well as an audit history of any classifications that were placed—by whom and when).
- All users that have access to view a file or folder may also view the assigned classification or classifications via an add-in for Windows File Explorer (or equivalent navigation method).
- A user that is able to manage classifications is able to remove a named classification on a given file or folder (including all files in the folder) in the In-Place database via an add-in for Windows File Explorer (or equivalent navigation method)

Snapshot 7: Dispositions

According to the disclosure, a snapshot of dispositions may include the following:

- A network administrator is able to authorize a user or group to be able to "manage dispositions".
- A user that is able to manage dispositions may create a new named "disposition" via an Administration interface. Such a disposition will have a name, description and a disposal date. Note that the disposal date may be today's date if desired (i.e., dispose of the file immediately).
- A user that is able to manage dispositions may view all files or folders that have a given named "disposition" placed on them via an Administration interface.
- A user that is able to manage dispositions is able to assign a named disposition on a given file (or folder) either as themselves (default) or as a group that they are a member of (both of these as determined by Active Directory), that they can see on a locked-down network drive via an add-in for Windows File Explorer (or equivalent navigation method). This assignment is recorded in the In-Place database (for the given file or folder (including all files in this folder)).
- A reviewable audit will exist that can be used to verify the current state of any file in the In-Place database (i.e. which are currently under "disposition"—as well as an audit history of any dispositions that were placed—by whom and when)
- A user that is able to manage dispositions is able to remove a named disposition on a given file or folder (including all files in the folder) in the In-Place database via an add-in for Windows File Explorer (or equivalent navigation method).
- An automated process will automatically delete any files tagged as "disposition" in the In-Place database (for a given network drive), once the "disposition date" has occurred. Note however that files that are "locked" will not be deleted. An actual delete of the file will be done on the network drive, as will an equivalent delete of the "shadow copy" of the file on the "shadow copy" network drive. An audit of this event will also be recorded in the In-Place database (for the given files)

Snapshot 8: Holds

According to the disclosure, a snapshot of holds may include the following:

- A network administrator is able to authorize a user or group to be able to "manage holds".
- A user that is able to manage holds may create a new named "hold" via an Administration interface. Such a hold will have a name, description and a review date. Note that the review date can be indefinite if desired.
- A user that is able to manage holds may view all files or folders that have a given named "hold" placed on them via an Administration interface.
- A user that is able to manage holds is able to assign a named hold on a given file (or folder) either as themselves (default) or as a group that they are a member of (both of these as determined by Active Directory), that they can see on a locked-down network drive via an add-in for Windows File Explorer (or equivalent navigation method). This assignment is recorded in the In-Place database for the given file or folder (including all files in this folder).
- Upon completing the "hold", the file or folder (including all files in the folder) will automatically be marked as "locked" in the In-Place database for that given file.
- A "locked" file cannot be "checked-out".

A reviewable audit will exist that can be used to verify the current state of any file in the In-Place database (i.e., which are currently under "hold"—as well as an audit history of any "holds" that were placed-by whom and when).

A user that is able to manage holds is able to remove a "hold" on a given file or folder (including all files in the folder) that is in a "locked" state in the In-Place database via an add-in for Windows File Explorer (or equivalent navigation method).

When a user that is able to manage holds removes a "hold" on a file or folder (including all files in the folder), the "locked" state on the file(s) is removed in the In-Place database.

An automated process will automatically remove "hold" locks on files in the In-Place database, once the "review date" has expired. An audit of this event will also be recorded in the In-Place database (for the given files).

According to this disclosure an In-Place Content Management system has multiple differences with existing enterprise content management (ECM) systems. For OpenText Content Server, all of the desired documents would have to be migrated into Content Server first, which could take months or years, depending on the amount of data (with Shinydocs In-Place Content Management, no migration is required as the documents are managed where they are). Content Server is also known to have a hard upper limit of around 300 TB (about 300 million documents), so attempting to manage more data that that may not be possible (with Shinydocs In-Place Content Management, there is no upper limit). Lastly Content Server has an unfriendly UI which has hampered its adoption in organizations where it is deployed (Shinydocs In-Place Content Management uses the familiar existing Windows File Explorer interface, so users do not need to change the way they work).

For Microsoft Sharepoint Online (Office 365), all of the desired documents would have to be migrated into SharePoint Online first, which could take months or years, depending on the amount of data (with Shinydocs In-Place Content Management, no migration is required as the documents are managed where they are). Since SharePoint Online is a cloud service, it is expected to be slower than on-premises In addition, being a cloud service may be a security concern for some organizations (Shinydocs In-Place Content Management uses existing file share on-premises infrastructure which will be faster than cloud and will already has enterprise level security in place).

With IBM FileNet, all of the desired documents would have to be migrated into FileNet first, which could take months or years, depending on the amount of data (with Shinydocs In-Place Content Management, no migration is required as the documents are managed where they are). As FileNet is older technology, there is likely a hard upper limit on the amount of data it can hold, but that limit is unknown (so attempting to manage more data that that may not be possible—with Shinydocs In-Place Content Management, there is no upper limit). FileNet has a very difficult to learn UI, which has hampered adoption in organizations where it is deployed (Shinydocs In-Place Content Management uses the familiar existing Windows File Explorer interface, so users do not need to change the way they work).

M-Files is a "layer" that sits on top of all connected repositories (presenting a new interface for navigating to documents). The main difference with this product is that it changes the way an end-user has to access files, which would certainly hamper adoption in organizations (Shinydocs In-Place Content Management uses the familiar existing Windows File Explorer interface, so users do not need to change the way they work). M-Files is also mainly a cloud service, which may be a security concern for some organizations (Shinydocs In-Place Content Management uses existing file share on-premises infrastructure which will be faster than cloud and will already has enterprise level security in place).

According to further embodiments, for implementing an end-user experience where users can check-out or check-in files, one may adapt a Windows File System add-in. If files were checked-out, the info could be stored in a table. An automated process would check this table every few seconds (e.g., a small SQLite database). If a check-out (or check-in) was requested, an automated process to run such as "Set-FileSystemPermissions" to change permissions on the file(s) in question would have to be run before the end-user could do anything. A similar strategy for rename, move, delete, add classification, add hold, and add disposition could be implemented.

According to further embodiments, the In-Place Content Management System may implement a Malware Detection Module on the server, as part of the Content Management System 40, which tracks Check Out and Check In requests for files, and monitors for activity which may be indicative of malware on the client computer, or malicious intent on the part of the user. If this module detects unusual Check Out activity, it may cause the File Explorer plug-in on the respective client (which is requesting the Check Outs) to take an appropriate action, such as one or more of displaying a message indicating the files being checked out or displaying a message indicating that malware may be present. In addition, the module, upon detecting such activity, may take one or more of the following actions: log the condition in the system log, notify the system administrator of the situation, delay taking action on any Check Out requests from the client, bar the client from accessing the system entirely, notify other CMS servers of the situation, or take another action in response to the perceived situation.

The Malware Detection Module may detect potential malware on a client computer through one or more of the following:

counting of Check Out requests from a client within a period of time, with such a count increasing over a given threshold;

logging which files are typically checked out by each client and noting a significant departure from typical usage;

heuristically determining that the checkout behaviour of a client is abnormal;

using an artificial intelligence system to detect probable malware behaviour;

any other system of detecting malware-related requests from a client.

According to the disclosure, a computer-implemented method for controlling access to files in a file system as would be implemented in an enterprise content management (ECM) system, using an in-place content management system is disclosed. The method comprises the steps of scanning the file system, making a shadow copy of existing permissions on all files and folders in the file system, loading the folder structure into a database so there is a record of the structure and the metadata associated with all files and folders and changing the file system permissions wherein all permission except read-access is removed from all files and folders in the file system. According to the method, accessing permissions at the user level are not changed. Furthermore, users gain access to files and folders via a Windows File Explorer add-in and the method utilizes New Technology File System (NTFS) permissions.

According to the disclosure, the files in the method further comprising data and documents. The users of the method who had the ability to read the file or folder previously still has this ability and users that did not have any read access previously continue to not have this access.

According to the disclosure, the Windows File Explorer add-in of the method enables the ability to check-out documents, temporarily restricting document edit access to a single user, check-in the same documents, and restore edit access once the user is done with the file. The method further comprises editing a document once it has been checked-out by double-clicking on the document to open it in its associated editing tool.

According to the disclosure, the method further comprises access to other file system actions, the other file system actions selected from a list consisting of add file, rename file, move file, and delete file. The other file system actions only remain valid for the user possessing the requisite permissions, as confirmed by checking the "shadow copy" permissions, before the permissions were removed.

According to the disclosure, the actions that are taken of the method are audited and stored in a database that is administered by a central Internet Information Services (IIS) server. The authorized end-users of the method are configured to assign a Classification value to a document, assign a Hold to a document, and assign a Disposition value to a document.

According to the disclosure, an in-place content management system configured to support enterprise content management (ECM) system functionality with data residing on a New Technology File System (NTFS) is disclosed. The system comprises memory, a network interface, a processor coupled to the memory and the network interface. The processor is configured to execute a file manager stored in the memory, the file manager for receiving user file commands and outputting user file information, a file system, accessible via network, being the location where the files are stored and accessed, an active directory for managing permission access to the features of the in-place content management application, and for implementation of specific in-place content management permissions, and one or more database to be configured and used for the storage of content management attributes associated with files accessed via the in-place content management system.

According to the disclosure, the system further comprises an in-place content management module stored in the memory, the in-place content management system interface configured to receive user file commands from the file manager and translate the user file commands into content management commands for sending to the remote content management system via the network interface, the content management system interface further configured to receive remote file information from the remote content management system via the network interface and translate the remote file information into user file information for the file manager. The in-place content management module is configured to support summaries, audit, versions, dispositions and permissions.

According to the disclosure, the summaries of the system further comprising summaries for metadata, categories, attributes and insights. The system further comprises supporting a plurality of features selected form a list consisting of check-out, check-in, security, audit, add, rename, move, delete, classification, legal holds and disposition. The system leverages existing security that is already in place on files and folders to support content management actions.

According to the disclosure, the content management actions of the system is selected from a list consisting of check-out, check-in, audit history, add classifications, trigger dispositions, and apply legal holds on documents where they reside. The check-out and check-in content management actions of the system is configured to prevent multiple users from editing the same document at the same time.

According to the disclosure, users gain access to files and folders of the system via a Windows File Explorer add-in. The Windows File Explorer add-in enables the ability to check-out documents, temporarily restricting document edit access to a single user, check-in the same documents, and restore edit access once the user is done with the file.

According to the disclosure, the system further comprises access to other file system actions, the other file system actions selected from a list consisting of add file, rename file, move file, and delete file. The other file system actions only remain valid for the user possessing the requisite permissions, as confirmed by checking the "shadow copy" permissions, before the permissions were removed. The authorized users of the system are configured to assign a Classification value to a document, assign a Hold to a document, and assign a Disposition value to a document.

Numerous advantages of the present invention should be apparent from the above. In addition to a familiar and intuitive interface being provided for remote content management system, network traffic can be reduced by the handling of temporary files. Migration from legacy storage to modern content management systems is also facilitated in a transparent and efficient manner. Other advantages should also be apparent to those skilled in the art.

While the foregoing provides certain non-limiting example embodiments, it should be understood that combinations, subsets, and variations of the foregoing are contemplated. The monopoly sought is defined by the claims.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. An in-place content management system configured to support enterprise content management (ECM) system functionality with data residing on a New Technology File System (NTFS), the system comprising:

memory;

a network interface;

a processor coupled to the memory and the network interface, the processor configured to execute:

a file manager stored in the memory, the file manager for receiving user file commands and outputting user file information;

a file system, accessible via network, being the location where the files are stored and accessed;

an active directory for managing permission access to the features of the in-place content management application, and for implementation of specific in-place content management permissions;

one or more database to be configured and used for the storage of content management attributes associated with files accessed via the in-place content management system;

an in-place content management module stored in the memory, the in-place content management system interface configured to receive user file commands from the file manager and translate the user file commands into content management commands for sending to the remote content management system via the network interface, the content management system interface further configured to receive remote file information from the remote content management system via the network interface and translate the remote file information into user file information for the file manager;

wherein the in-place content management module is configured to support summaries, audit, versions, dispositions and permissions;

wherein the in-place content management module is configured access to other file system actions, the other file system actions selected from a list consisting of add file, rename file, move file, and delete file;

wherein the other file system actions only remain valid for the user possessing the requisite permissions, as confirmed by checking the "shadow copy" permissions, before the permissions were removed;

wherein the in-place content management module is further configured to scan the file system, make a shadow copy of existing permissions on all files and folders in the file system, load a folder structure into a database so there is a record of the structure and the metadata associated with all files and folders, and change the file system permissions wherein all permissions except read-access are removed from all files and folders in the file system, while accessing permissions at the user level are not changed;

wherein the in-place content management module provides an overlay on the file system such that content management functionality is provided without migrating files from the file system to a separate content management repository.

2. The system of claim 1 wherein summaries further comprising summaries for metadata, categories, attributes and insights.

3. The system of claim 1 further comprises supporting a plurality of features selected form a list consisting of check-out, check-in, security, audit, add, rename, move, delete, classification, legal holds and disposition.

4. The system of claim 1 wherein the system leverages existing security that is already in place on files and folders to support content management actions.

5. The system of claim 4 content management actions is selected from a list consisting of check-out, check-in, audit history, add classifications, trigger dispositions, and apply legal holds on documents where they reside.

6. The system of claim 1 wherein the system is configured to support check-out and check-in content management actions that are configured to prevent multiple users from editing the same document at the same time.

7. The system of claim 1 wherein users gain access to files and folders via a Windows File Explorer add-in.

8. The system 7 wherein the Windows File Explorer add-in enables the ability to check-out documents, temporarily restricting document edit access to a single user, check-in the same documents, and restore edit access once the user is done with the file.

9. The system of claim 1 wherein authorized users are configured to assign a Classification value to a document, assign a Hold to a document, and assign a Disposition value to a document.

* * * * *